(12) United States Patent
Ahn et al.

(10) Patent No.: US 12,269,224 B2
(45) Date of Patent: Apr. 8, 2025

(54) SYSTEMS FOR FORMING COMPOSITE PARTS, METHODS OF FORMING COMPOSITE PARTS, AND METHODS OF PRECISELY PERFORMING A PLURALITY OF OPERATIONS ON A COMPOSITE PART

(71) Applicant: The Boeing Company, Chicago, IL (US)

(72) Inventors: Jonathan Young Ahn, Seattle, WA (US); Christopher Robert Brown, Seattle, WA (US); Shuonan Dong, Seattle, WA (US); Ricardo Andreas Fritzke, Sammamish, WA (US); Daniel James McMillan, Edmonds, WA (US)

(73) Assignee: The Boeing Company, Arlington, VA (US)

( * ) Notice: Subject to any disclaimer, the term of this patent is extended or adjusted under 35 U.S.C. 154(b) by 377 days.

(21) Appl. No.: 17/849,459

(22) Filed: Jun. 24, 2022

(65) Prior Publication Data

US 2023/0415433 A1      Dec. 28, 2023

(51) Int. Cl.
*B29C 33/42* (2006.01)
*B29C 70/54* (2006.01)
(Continued)

(52) U.S. Cl.
CPC .......... *B29C 70/545* (2013.01); *B29C 33/424* (2013.01); *B29C 37/0053* (2013.01);
(Continued)

(58) Field of Classification Search
CPC ................ B29C 33/424; B29C 70/545; B29C 70/30–388; B29C 2793/0045
See application file for complete search history.

(56) References Cited

U.S. PATENT DOCUMENTS

| 4,613,942 A | 9/1986 | Chen |
| 5,579,444 A | 11/1996 | Dalziel et al. |

(Continued)

FOREIGN PATENT DOCUMENTS

| EP | 2138861 A1 | 12/2009 |
| GB | 2204814 A | 11/1988 |

(Continued)

OTHER PUBLICATIONS

European Patent Office, Extended European Search Report in related Application No. EP22163299, Nov. 29, 2023.

(Continued)

*Primary Examiner* — Atul P. Khare
(74) *Attorney, Agent, or Firm* — Kolitch Romano Dascenzo Gates LLC

(57) ABSTRACT

Systems for forming composite parts, methods of forming composite parts, and methods of precisely performing a plurality of operations on a composite part. The systems include a layup mandrel that includes a mandrel body and a plurality of regions of isotropic surface finish. The methods of forming the composite part include positioning a plurality of plies of composite material on a layup mandrel, conforming the plurality of plies of composite material to a layup surface shape of the layup mandrel, and curing the plurality of plies of composite material. The methods of precisely performing the plurality of operations on a composite part include detecting a corresponding imprinted feature of a plurality of imprinted features, aligning an operating assembly of an end effector relative to the corresponding imprinted feature, and performing a corresponding operation of the plurality of operations on the composite part.

20 Claims, 9 Drawing Sheets

(51) Int. Cl.
  *B29C 37/00* (2006.01)
  *B29L 31/30* (2006.01)
(52) U.S. Cl.
  CPC .......... *B29C 2793/0045* (2013.01); *B29K 2995/0072* (2013.01); *B29K 2995/0094* (2013.01); *B29L 2031/3076* (2013.01); *B29L 2031/3085* (2013.01)

(56) References Cited

U.S. PATENT DOCUMENTS

| | | | |
|---|---|---|---|
| 5,727,300 A | 3/1998 | Ekdahl et al. | |
| 6,167,607 B1 | 1/2001 | Pryor | |
| 6,328,523 B1 | 12/2001 | Watanabe et al. | |
| 7,076,856 B2* | 7/2006 | Sarh | B25B 11/005 29/796 |
| 7,141,191 B2* | 11/2006 | Engwall | B29C 70/545 264/156 |
| 7,362,437 B2 | 4/2008 | Engelbart et al. | |
| 7,755,761 B2 | 7/2010 | Mathis et al. | |
| 8,050,486 B2 | 11/2011 | Walton | |
| 8,224,121 B2 | 7/2012 | Safai et al. | |
| 8,641,406 B2* | 2/2014 | Kulenkampff | B29C 70/545 425/235 |
| 8,978,967 B2 | 3/2015 | Gamboa et al. | |
| 9,299,118 B1 | 3/2016 | McGraw | |
| 9,302,785 B2 | 4/2016 | Buckus et al. | |
| 9,568,906 B2 | 2/2017 | Trautman et al. | |
| 9,761,002 B2 | 9/2017 | Mundhenk et al. | |
| 9,789,462 B2 | 10/2017 | Singh | |
| 9,789,549 B2 | 10/2017 | Nguyen et al. | |
| 10,328,411 B2 | 6/2019 | Singh | |
| 10,556,305 B2 | 2/2020 | Lee et al. | |
| 10,576,680 B2* | 3/2020 | Hills | B29C 51/225 |
| 10,657,419 B2 | 5/2020 | Kurtz et al. | |
| 10,828,822 B2* | 11/2020 | Cloud | B29C 51/105 |
| 2003/0173492 A1 | 9/2003 | Kajiyama | |
| 2007/0188606 A1 | 8/2007 | Atkinson et al. | |
| 2007/0271053 A1 | 11/2007 | Palmateer | |
| 2008/0181485 A1 | 7/2008 | Beis et al. | |
| 2009/0198464 A1 | 8/2009 | Clarke et al. | |
| 2010/0324737 A1 | 12/2010 | Handa et al. | |
| 2012/0059517 A1 | 3/2012 | Nomura | |
| 2013/0100256 A1 | 4/2013 | Kirk et al. | |
| 2013/0218324 A1 | 8/2013 | Furuya | |
| 2013/0266205 A1 | 10/2013 | Valpola | |
| 2015/0012171 A1 | 1/2015 | Richter et al. | |
| 2015/0160650 A1 | 6/2015 | Scelsi et al. | |
| 2015/0217451 A1 | 8/2015 | Harada et al. | |
| 2016/0167318 A1* | 6/2016 | Cebolla Garrofe | B29C 70/06 156/64 |
| 2016/0282110 A1 | 9/2016 | Vagman et al. | |
| 2017/0074755 A1 | 3/2017 | Adiga et al. | |
| 2017/0219336 A1 | 8/2017 | Kurtz et al. | |
| 2018/0107895 A1 | 4/2018 | Beller et al. | |
| 2018/0147797 A1 | 5/2018 | Chassignet | |
| 2018/0172645 A1* | 6/2018 | Fieni | G01N 29/30 |
| 2019/0152171 A1* | 5/2019 | Howe | B29C 70/48 |
| 2019/0213724 A1 | 7/2019 | Avrahami et al. | |
| 2019/0272411 A1 | 9/2019 | Zou et al. | |
| 2020/0094359 A1 | 3/2020 | Lee et al. | |
| 2020/0242413 A1 | 7/2020 | Kurtz et al. | |
| 2022/0152955 A1 | 5/2022 | Smith et al. | |

FOREIGN PATENT DOCUMENTS

| | | |
|---|---|---|
| GB | 2486658 A | 6/2012 |
| WO | WO 03034165 A1 | 4/2003 |

OTHER PUBLICATIONS

Zhao et al., "Robust background subtraction in HSV color space," Proceedings of SPIE, vol. 4861, pp. 325-332, XP055651592, Dec. 1, 2002.

Mehrotra et al., "Gabor Filter-Based Edge Detection," Pattern Recognition, vol. 25, No. 12, pp. 1479-1494, XP000336458, Dec. 1, 1992.

Hashimoto et al., "Vision System for Object Handling Robot Using a Low-Resolution Range Image and an Intensity Image", Systems and Computers in Japan, vol. 33, No. 7, 2002, pp. 21-29 (Year: 2002).

* cited by examiner

SYSTEMS FOR FORMING COMPOSITE PARTS, METHODS OF FORMING COMPOSITE PARTS, AND METHODS OF PRECISELY PERFORMING A PLURALITY OF OPERATIONS ON A COMPOSITE PART

FIELD

The present disclosure relates generally to layup mandrels with embedded textured pins, to methods of manufacturing layup mandrels, to methods of repairing layup mandrels, to systems for forming composite parts, to methods of forming composite parts, to robotic systems, and to methods of precisely performing a plurality of operations on a composite part.

BACKGROUND

It may be desirable to perform a plurality of operations on a large part, such as an aircraft and/or a component thereof. However, it may be difficult to precisely perform the plurality of operations at desired locations on the composite part in an automated fashion and/or utilizing conventional robotic systems, which may determine a location for each operation based upon and/or within a global coordinate system. Thus, there exists a need for layup mandrels with embedded textured pins, for methods of manufacturing layup mandrels, for methods of repairing layup mandrels, for systems for forming composite parts, for methods of forming composite parts, for robotic systems, and for methods of operating robotic systems, according to the present disclosure.

SUMMARY

Systems for forming composite parts, methods of forming composite parts, and methods of precisely performing a plurality of operations on a composite part are disclosed herein. The systems include a layup mandrel that includes a mandrel body and a plurality of regions of isotropic surface finish. The mandrel body defines a layup surface that defines a layup surface finish roughness. The each region of isotropic surface finish defines an isotropic surface finish roughness that is greater than the layup surface finish roughness. A location of each region of isotropic surface finish corresponds to a desired location for a fastener hole within a composite part.

The methods of forming the composite part include positioning a plurality of plies of composite material on a layup mandrel, conforming the plurality of plies of composite material to a layup surface shape of the layup mandrel, and curing the plurality of plies of composite material to define the composite part. The layup mandrel includes a mandrel body that defines a layup surface that defines a layup surface finish roughness. The layup mandrel also includes a plurality of regions of isotropic surface finish spaced-apart on the layup surface. The isotropic surface finish defines an isotropic surface finish roughness that is greater than the layup surface finish roughness, and a location of each region of isotropic surface finish of the plurality of regions of isotropic surface finish corresponds to a desired location for a fastener hole within the composite part. The conforming includes imprinting, within at least a mandrel-contacting ply of the plurality of plies of composite material, the layup surface finish roughness within regions of the mandrel-contacting ply that contact the layup surface and the isotropic surface finish roughness within regions of the mandrel-contacting ply that contact the plurality of regions of isotropic surface finish. Subsequent to the curing, the composite part includes a plurality of spaced-apart imprinted features, and a location of each spaced-apart imprinted feature of the plurality of spaced-apart imprinted features corresponds to a location of a corresponding region of isotropic surface finish of the plurality of regions of isotropic surface finish.

The methods of precisely performing the plurality of operations on a composite part include detecting a corresponding imprinted feature of a plurality of imprinted features, aligning an operating assembly of an end effector of a robotic system relative to the corresponding imprinted feature, and performing a corresponding operation of the plurality of operations on the composite part. The detecting includes detecting with a vision system of the end effector, and the corresponding imprinted feature has an isotropic feature surface finish with a roughness that is greater than a surface roughness of a remainder of the composite part. The aligning includes aligning with a positioning system of the robotic system. The performing includes performing with the operating assembly of the robotic system.

DESCRIPTION

Figure 1:
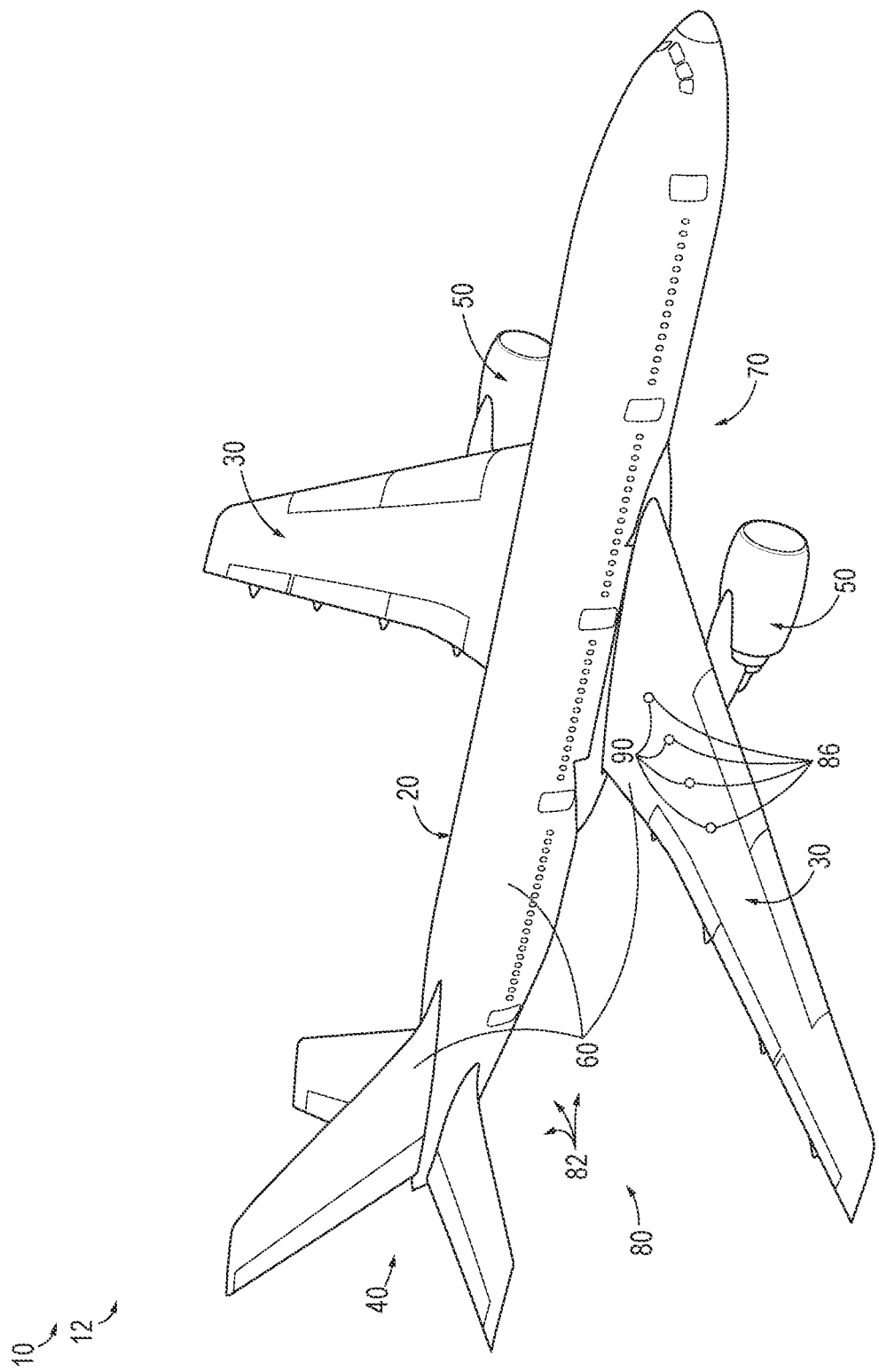
FIG. 1 is a schematic illustration of an example of a composite part assembly, in the form of an aircraft, that may include, utilize, be formed from, and/or be formed utilizing the layup mandrels, systems, and/or methods, according to the present disclosure.

FIGS. 1-13 provide illustrative, non-exclusive examples of composite part assemblies 10, of systems 94 for forming a composite part, of robotic systems 100, of layup mandrels 200, and/or of methods 300, 400, 500, and 600, according to the present disclosure. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of an example of a composite part assembly 10, in the form of an aircraft 12, that may include, utilize, be formed from, and/or be formed utilizing layup mandrels 200, systems 94 for forming a composite part, robotic systems 100, and/or methods 300, 400, 500, and/or 600, according to the present disclosure. Composite part assembly 10, in the form of aircraft 12 includes a plurality of components, including a fuselage 20, a wing 30, a tail 40, an engine 50, a skin 60, and a frame 70. At least one component of composite part assembly 10 may include and/or be a composite part 80, which may be formed from and/or defined by a plurality of plies 82 of composite material. In some examples, composite part 80 may include a plurality of fastener holes 86 and/or may be operatively attached to at least one other component of composite part assembly 10 with, via, and/or utilizing a plurality of fasteners 90.

During fabrication of large and/or complex composite part assemblies 10, such as during fabrication of aircraft 12, it may be important to precisely and/or accurately position fastener holes 86, and corresponding fasteners 90, relative to a remainder of the composite part assembly. As discussed in more detail herein, systems 94, robotic systems 100, layup mandrels 200, and/or methods 300, 400, 500, and 600, according to the present disclosure, may permit and/or facilitate this accurate and/or precise positioning. More specifically, and also discussed in more detail herein, systems 94, layup mandrels 200, and/or methods 300, 400, and/or 500 may be utilized to form and/or define composite parts 80 that include imprinted features 88, as illustrated in FIGS. 6-9. In addition, robotic systems 100 and/or methods 600 may utilize and/or reference imprinted features 88 to precisely position fastener holes 86 within which fasteners 90 may be positioned.

Figure 2:
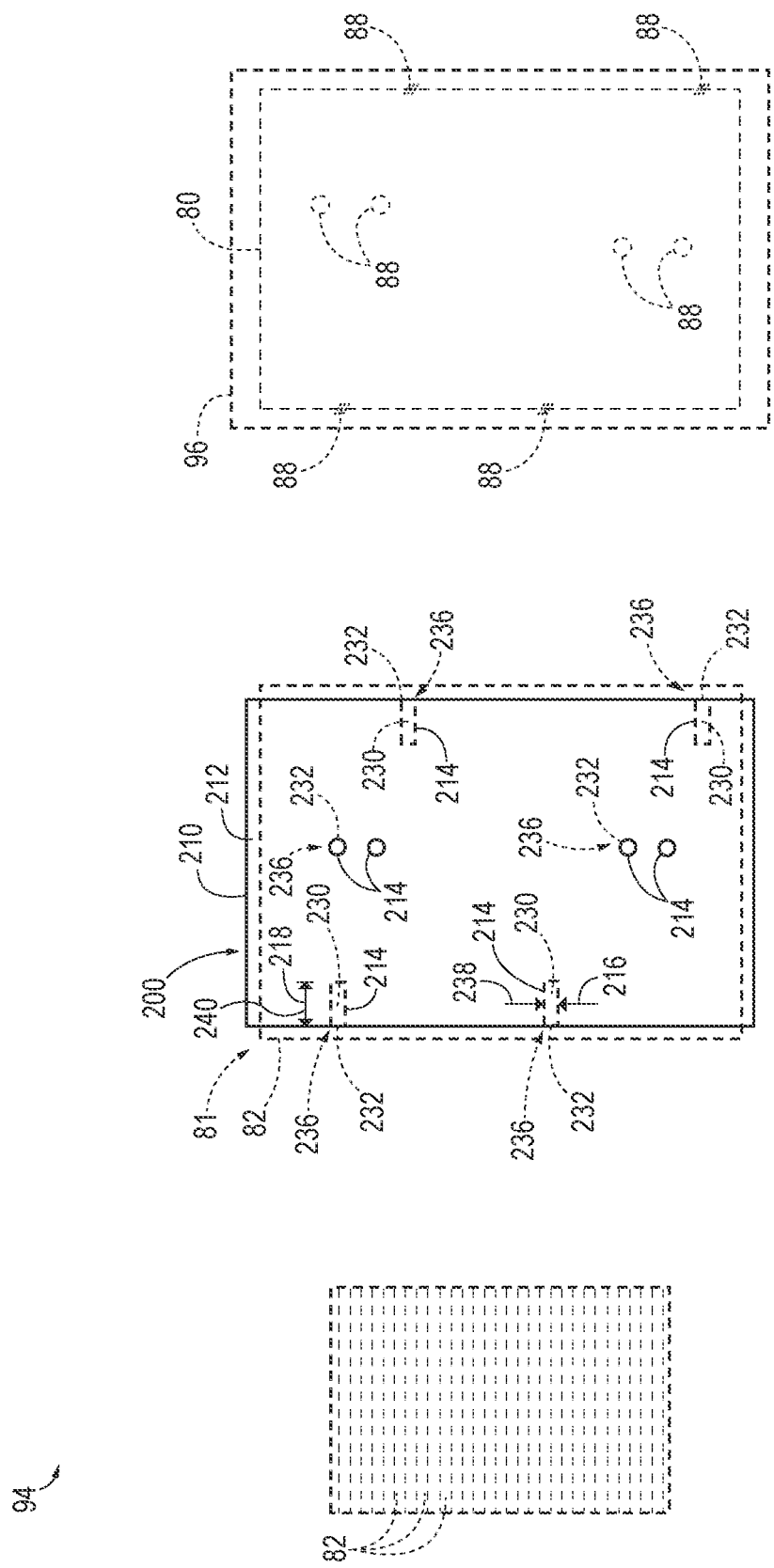
FIG. 2 is a schematic illustration of examples of systems for forming a composite part and/or of layup mandrels that may be utilized therein, according to the present disclosure.
Figure 5:
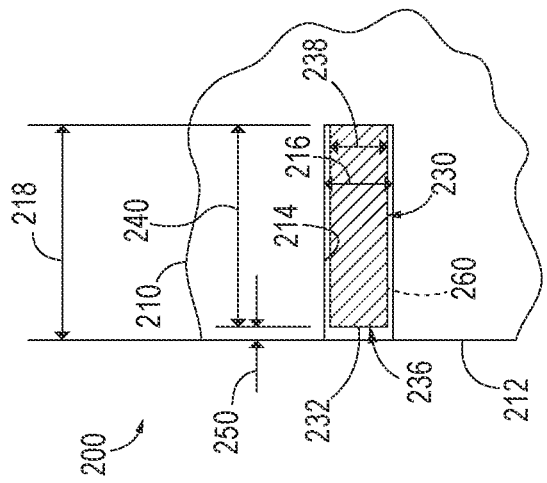
FIG. 5 is a less schematic illustration of examples of a region of a layup mandrel, according to the present disclosure.
Figure 4:
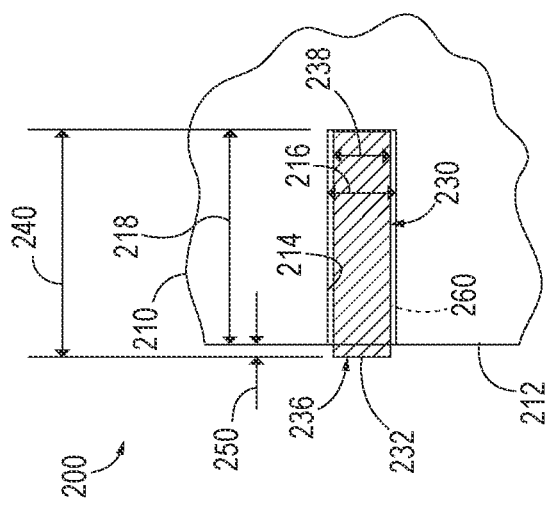
FIG. 4 is a less schematic illustration of examples of a region of a layup mandrel, according to the present disclosure.
Figure 3:
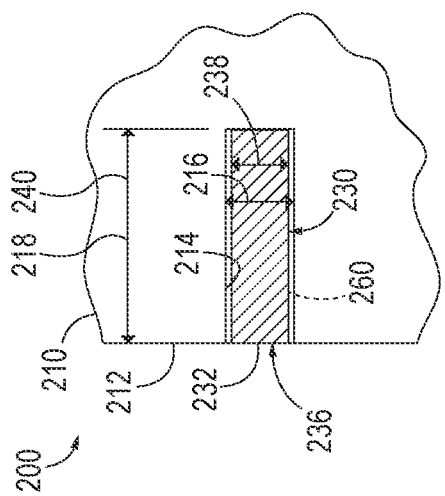
FIG. 3 is a less schematic illustration of examples of a region of a layup mandrel, according to the present disclosure.
Figure 7:
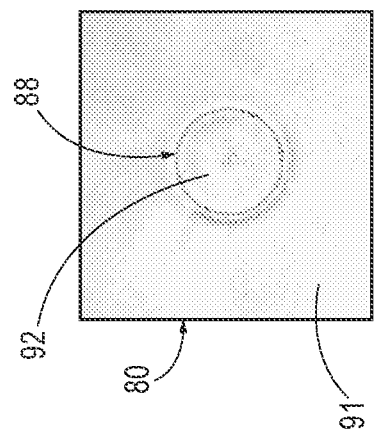
FIG. 7 is an image illustrating an example of a primed isotropic surface finish as viewed by a vision system of a robotic system, according to the present disclosure.
Figure 6:
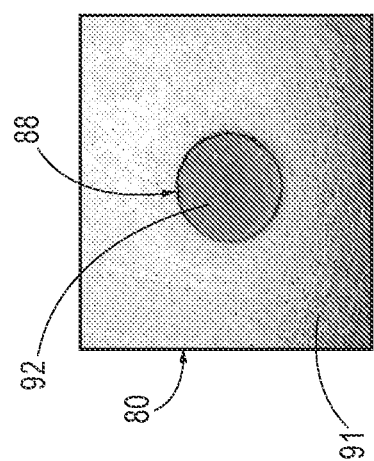
FIG. 6 is an image illustrating an example of an unprimed isotropic surface finish as viewed by a vision system of a robotic system, according to the present disclosure.

FIG. 2 is a schematic illustration of examples of systems 94 for forming a composite part and/or of layup mandrels 200 that may be utilized therein, according to the present disclosure. FIGS. 3-5 are less schematic illustrations of examples of a regions of layup mandrels 200, according to the present disclosure. FIG. 6 is an image illustrating an example of a composite part 80 that includes an unprimed imprinted feature 88 that includes an isotropic surface finish as viewed by a vision system of a robotic system, according to the present disclosure, such as a vision system 120 of robotic system 100 of FIGS. 8-9. FIG. 7 is an image illustrating an example of composite part 80 that includes a primed, or painted, imprinted feature 88 that includes an isotropic surface finish as viewed by vision system 120.

As illustrated in FIG. 2, systems 94, which are configured for forming composite parts 80 that include imprinted features 88, include a layup mandrel 200. Layup mandrel 200 includes a mandrel body 210 that includes and/or defines a layup surface 212. Layup surface 212 has and/or defines a layup surface finish roughness. Layup mandrel 200 also includes a plurality of regions 236 of isotropic surface finish. Regions 236 are spaced-apart on layup surface 212, and each region 236 defines an isotropic surface finish roughness that is greater than the layup surface finish roughness. In addition, a location of each region 236 corresponds to a desired location for a fastener hole within the composite part, such as fastener hole 86 in composite part 80 of FIG. 1.

Regions 236 may have and/or define any suitable isotropic surface finish roughness. As used herein, the phrase "isotropic surface finish roughness" refers to a surface finish roughness that is non-directional, that is omnidirectional, and/or that is the same, or at least substantially the same, as measured within, parallel to, and/or a least substantially parallel to a plane of layup surface 212. Stated differently, the isotropic surface finish roughness of regions 236 is uniform within regions 236 and/or does not vary with direction within regions 236. Such a configuration has been shown to produce and/or to generate imprinted features 88 that are durable and/or that readily may be recognized by vision systems 120 of robotic systems 100 of FIGS. 8-9. In addition, such a configuration also permits imprinted features 88 to be "fly away" features that need not be removed prior to placing an aircraft 12, as illustrated in FIG. 1, that includes such features into service. Stated differently, a size, an extent, and/or a roughness of imprinted features 88 may be such that imprinted features 88 comply with applicable manufacturing standards for inclusion within aircraft 12.

Examples of the isotropic surface finish roughness include roughness average (Ra) roughnesses of at least 0.5 micrometer (μm), at last 0.6 μm, at least 0.7 μm, at least 0.8 μm, at least 0.9 μm, at least 1 μm, at least 1.2 μm, at least 1.4 μm, at least 1.6 μm, at least 1.8 μm, at least 2 μm, at least 2.2 μm, at least 2.4 μm, at least 2.6 μm, at least 2.8 μm, at least 3 μm, at least 3.175 μm, at least 3.2 μm, at least 3.4 μm, at least 3.6 μm, at least 3.8 μm, at least 4 μm, at least 4.2 μm, at least 4.4 μm, at least 4.6 μm, at least 4.8 μm, at least 5 μm, at least 5.2 μm, at least 5.4 μm, at least 5.6 μm, at least 5.8 μm, at least 6 μm, at most 15 μm, at most 14 μm, at most 13 μm, at most 12 μm, at most 11 μm, at most 10 μm, at most 9 μm, at most 8 μm, at most 7.8 μm, at most 7.6 μm, at most 7.4 μm, at most 7.2 μm, at most 7 μm, at most 6.8 μm, at most 6.6 μm, at most 6.4 μm, at most 6.350 μm, at most 6.2 μm, at most 6 μm, at most 5.8 μm, at most 5.6 μm, at most 5.4 μm, at most 5.2 μm, at most 5 μm, at most 4.8 μm, at most 4.6 μm, at most 4.4 μm, at most 4.2 μm, at most 4 μm, at most 3.8 μm, at most 3.6 μm, at most 3.4 μm, at most 3.2 μm, and/or at most 3 μm.

In some examples, the isotropic surface finish roughness of regions 236 may be a threshold roughness multiple of the layup surface finish roughness of layup surface 212. Stated differently, the isotropic surface finish roughness may be a product of the threshold roughness multiple and the layup surface finish roughness. Examples of the threshold roughness multiple include at least 1.1, at least 1.2, at least 1.3, at least 1.4, at least 1.5, at least 1.6, at least 1.7, at least 1.8, at least 1.9, at least 2, at least 2.1, at least 2.2, at least 2.3, at least 2.4, at least 2.5, at least 2.6, at least 2.7, at least 2.8, at least 2.9, at least 3, at most 5, at most 4.8, at most 4.6, at most 4.4, at most 4.2, at most 4, at most 3.8, at most 3.6, at most 3.4, at most 3.2, at most 3, at most 2.8, at most 2.6, at most 2.4, at most 2.2, at most 2, at most 1.8, at most 1.6, and/or at most 1.4.

In some examples, and as discussed in more detail herein, regions 236 may be formed and/or defined by a plurality of isotropically textured pin end surfaces of a plurality of textured pin ends 232 of a plurality of textured pins 230. As an example, and as also discussed in more detail herein, mandrel body 210 may define a plurality of pin-receiving holes 214. In such a configuration, each textured pin 230 may be positioned within a corresponding pin-receiving hole 214 such that the isotropically textured pin end surface of textured pin end 232 faces away from the layup mandrel.

As illustrated in dashed lines in FIG. 2, system 94 may include and/or may be utilized with a plurality of plies 82 of composite material. As an example, and as discussed in more detail herein, plies 82 may be positioned on layup mandrel 200 and/or on layup surface 212 thereof, such as to form and/or define an uncured composite part 81.

As also illustrated in dashed lines in FIG. 2, system 94 may include and/or may be utilized with a cure oven 96. As an example, cure oven 96 may be utilized to heat uncured composite part 81, such as to cure uncured composite part 81 and/or to define composite part 80 that includes imprinted features 88.

Figure 12:
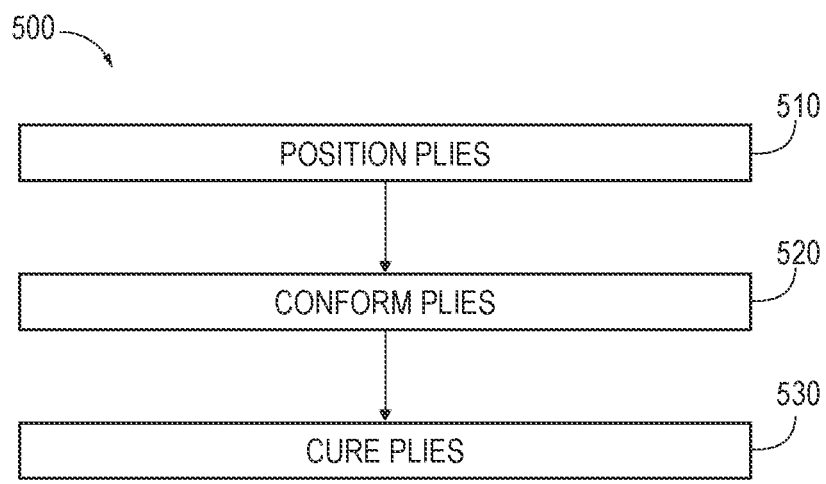
FIG. 12 is a flowchart depicting examples of methods of forming a composite part, according to the present disclosure.

During operative use of systems 94 to form and/or to define composite part 80, and as discussed in more detail herein with reference to methods 500 of FIG. 12, plies 82 may be positioned on layup surface 212 of layup mandrel 200. Plies 82 then may be conformed to a layup surface shape of layup surface 212 to define uncured composite part 81. This may include conforming such that at least a mandrel-contacting ply of plies 82 is imprinted with the layup surface finish roughness in regions of the mandrel-contacting ply that contact layup surface 212. In addition, regions of the mandrel-contacting ply that contact regions 236 of isotropic surface finish are imprinted with the isotropic surface finish roughness. This is illustrated, for example, in FIGS. 6-7, where regions 91 of composite part 80 that contacted layup surface 212 of FIG. 2 during formation of composite part 80 visually contrast with regions 92 of composite part 80 that contacted regions 236 of isotropic surface finish.

Subsequently, uncured composite part 81 may be cured within and/or by cure oven 96. Thus curing may form and/or define composite part 80 with corresponding imprinted features 88.

Turning more generally to FIGS. 2-5, layup mandrels 200, according to the present disclosure, include any suitable structure that defines layup surface 212, which has the corresponding layup surface finish roughness, and that also defines regions 236 of isotropic surface finish, which have the corresponding isotropic surface finish roughness. As an example, regions 236 of isotropic surface finish simply may be roughened regions of mandrel body 210. As another example, layup mandrels 200 may include mandrel body 210 and textured pins 230. In such examples, mandrel body 210 defines layup surface 212, which is configured to receive plies 82 to define a surface contour of composite part 80. In addition, mandrel body 210 also defines pin-receiving holes 214, which extend from layup surface 212 and/or into the mandrel body. Textured pins 230 are positioned within corresponding pin-receiving holes 214 and have textured pin ends 232 that define the isotropically textured pin end surface and that face away from layup mandrel 200. Stated differently, and in such examples, textured pin ends 232 may form, at least partially define, or even completely define regions 236 of isotropic surface finish and/or the corresponding isotropic surface finish roughness.

Textured pins 230 may include and/or be any suitable structure that may be adapted, configured, sized, finished, and/or constructed to be positioned within pin-receiving holes 214 and/or to define textured pin ends 232 with the corresponding isotropically textured pin end surface. In some examples, textured pins 230 may be sized for a friction fit within corresponding pin-receiving holes 214. In some examples, and as illustrated in dashed lines in FIGS. 3-5, textured pins may be sized for a slip fit within pin-receiving holes 214 and/or layup mandrels 200 may include an adhesive material 260 that may be positioned within pin-receiving holes 214 and/or that may be configured to adhesively retain textured pins 230 within corresponding pin-receiving holes 214. Additionally or alternatively, textured pins 230 may be threaded into pin-receiving holes 214 and/or may be retained within pin-receiving holes 214 with a corresponding fastener.

Textured pins 230 may have and/or define any suitable size and/or shape. As an example, textured pins 230 may include a cylindrical, or at least substantially cylindrical, pin region. Stated differently, textured pins 230 may include and/or be cylindrical, or at least partially cylindrical.

As another example, textured pins 230 may define a pin diameter 238, an average pin diameter, and/or an effective pin diameter. Examples of pin diameter 238 include at least 2 millimeters (mm), at least 2.2 mm, at least 2.4 mm, at least 2.6 mm, at least 2.8 mm, at least 3 mm, at least 3.2 mm, at least 3.4 mm, at least 3.6 mm, at least 3.8 mm, at least 4 mm, at least 4.2 mm, at least 4.4 mm, at least 4.6 mm, at least 4.8 mm, at least 5 mm, at most 8 mm, at most 7.8 mm, at most 7.6 mm, at most 7.4 mm, at most 7.2 mm, at most 7 mm, at most 6.8 mm, at most 6.6 mm, at most 6.4 mm, at most 6.2 mm, at most 6 mm, at most 5.8 mm, at most 5.6 mm, at most 5.4 mm, at most 5.2 mm, at most 5 mm, at most 4.8 mm, at most 4.6 mm, at most 4.4 mm, at most 4.2 mm, and/or at most 4 mm. A more specific example of pin diameter 238 is 3/16 inches, or 4.7625 mm. A particular pin diameter 238 may be selected based upon a preferred size, or diameter, for imprinted features 88 that may be formed utilizing a given textured pin 230.

As yet another example, textured pins 230 may define a pin length 240, or an average pin length. Examples of pin length 240 include at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at most 20 mm, at most 19 mm, at most 18 mm, at most 17 mm, at most 16 mm, at most 15 mm, at most 14 mm, at most 13 mm, at most 12 mm, at most 11 mm, at most 10 mm, at most 9 mm, at most 8 mm, at most 7 mm, and/or at most 6 mm. A given pin length 240 may be selected based, at least in part, upon a thickness of mandrel body 210 and/or a desired retention force for textured pins 230 within mandrel body 210.

In some examples, textured pin end 232 may include and/or be a circular, or at least substantially circular, textured pin end 232. In some examples, textured pin end 232 may include and/or be a planar, or at least substantially planar, textured pin end. In some examples, textured pin end 232 may extend perpendicular, or at least substantially perpendicular, to an elongate axis, or to a cylindrical axis, of each textured pin 230.

In some examples, textured pin end 232 is an abrasive grit blasted textured pin end. Examples of the roughness of textured pin end 232 are disclosed herein with reference to the isotropic surface finish roughness imprinted features 88.

Examples of a roughness ratio of the Ra roughness of textured pin end 232 to the Ra roughness of the layup surface are disclosed herein with reference to the roughness ratio of the Ra roughness of imprinted features 88 to the Ra roughness of the remainder of composite part 80.

In some examples, and as illustrated in FIG. 3, textured pin end 232 may be coplanar, or at least substantially coplanar, with a region of layup surface 212 that defines the corresponding pin-receiving hole 214. Additionally or alternatively, textured pin end 232 may be coplanar, or at least substantially coplanar, with an opening into the corresponding pin-receiving hole 214 that is defined by layup surface 212.

In some examples, and as illustrated in FIGS. 4-5, textured pin end 232 may be within a threshold pin end offset distance 250 of the region of layup surface 212 that defines the corresponding pin-receiving hole 214 and/or the opening into the corresponding pin-receiving hole 214 that is defined by layup surface 212. Examples of threshold pin end offset distance 250 include at most 1 mm, at most 0.9 mm, at most 0.8 mm, at most 0.7 mm, at most 0.6 mm, at most 0.5 mm, at most 0.4 mm, at most 0.3 mm, at most 0.2 mm, at most 0.1 mm, at most 90 µm, at most 80 µm, at most 70 µm, at most 60 µm, at most 55 µm, at most 50 µm, at most 45 µm, at most 40 µm, at most 35 µm, at most 30 µm, at most 25 µm, at most 20 µm, at most 15 µm, at most 10 µm, or at most 5 µm. Pin end offset distance 250 may, in some examples, simply be based upon a manufacturing tolerance for layup mandrels 200. Additionally or alternately, and in some examples, pin end offset distance 250 may be selected to provide a desired visibility, height, and/or depth of imprinted features 88 that are formed therefrom.

Mandrel body 210 may include any suitable structure that may define layup surface 212 and/or pin-receiving holes 214. In addition, pin-receiving holes 214 may have and/or define any suitable size and/or shape, such as may be sized for the friction-fit or for the slip-fit with textured pins 230. As an example, pin-receiving holes 214 may define a hole diameter 216, an average hole diameter, and/or an effective hole diameter. Examples of hole diameter 216 include at least 2 mm, at least 2.2 mm, at least 2.4 mm, at least 2.6 mm, at least 2.8 mm, at least 3 mm, at least 3.2 mm, at least 3.4 mm, at least 3.6 mm, at least 3.8 mm, at least 4 mm, at least 4.2 mm, at least 4.4 mm, at least 4.6 mm, at least 4.8 mm, at least 5 mm, at most 8 mm, at most 7.8 mm, at most 7.6 mm, at most 7.4 mm, at most 7.2 mm, at most 7 mm, at most 6.8 mm, at most 6.6 mm, at most 6.4 mm, at most 6.2 mm, at most 6 mm, at most 5.8 mm, at most 5.6 mm, at most 5.4 mm, at most 5.2 mm, at most 5 mm, at most 4.8 mm, at most 4.6 mm, at most 4.4 mm, at most 4.2 mm, and/or at most 4 mm. A more specific example of hole diameter 216 is 4.7625 mm.

When pin-receiving holes 214 are sized for the friction-fit with textured pins 230, hole diameter 216 may be less, or slightly less, than pin diameter 238. Alternatively, when pin-receiving holes 214 are sized for the slip-fit with textured pins 230, hole diameter 216 may be greater, or slightly greater, than pin diameter 238. Examples of a magnitude of a difference between hole diameter 216 and pin diameter 238 include at most 0.05 mm, at most 0.04 mm, at most 0.03 mm, at most 0.02 mm, or at most 0.01 mm.

Similarly, pin-receiving holes 214 may have and/or define any suitable hole depth 218, or average hole depth. Examples of hole depth 218 include at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at most 15 mm, at most 14.5 mm, at most 14 mm, at most 13.5 mm, at most 13 mm, at most 12.5 mm, and/or at most 12 mm. In some examples, hole depth 218 may correspond to, or equal, pin length 240. In some examples, a shape of pin-receiving holes 214 may correspond to a shape of textured pins 230.

It is within the scope of the present disclosure that at least one material property of mandrel body 210 may differ from a corresponding material property of textured pins 230. Such a configuration may provide improved durability for layup mandrels 200, may facilitate cleaning of layup mandrels 200, and/or may facilitate repair of layup mandrels 200. As an example, mandrel body 210 may be defined by a mandrel body material, textured pins 230 may be defined by a textured pin material, and/or the mandrel body material may differ from the textured pin material. Examples of the mandrel body material include a polymer, a carbon-fiber-reinforced polymer, a metal, aluminum, an aluminum alloy, structural steel, a nickel-iron alloy, and/or 64FeNi (Invar). Examples of the textured pin material include a thermoplastic, a polyetheretherketone, a metal, a steel, a mild steel, and/or a stainless steel.

In some examples, the textured pin material may define a textured pin hardness that is greater than a mandrel body material hardness of the mandrel body material. As examples, a ratio of the textured pin material hardness to the mandrel body material hardness may be at least 1.02, at least 1.04, at least 1.06, at least 1.08, at least 1.1, at least 1.15, at least 1.2, at least 1.3, at least 1.4, or at least 1.5. In some examples, the textured pin material may define a textured pin material durability that is greater than a mandrel body material durability of the mandrel body material.

Figure 8:
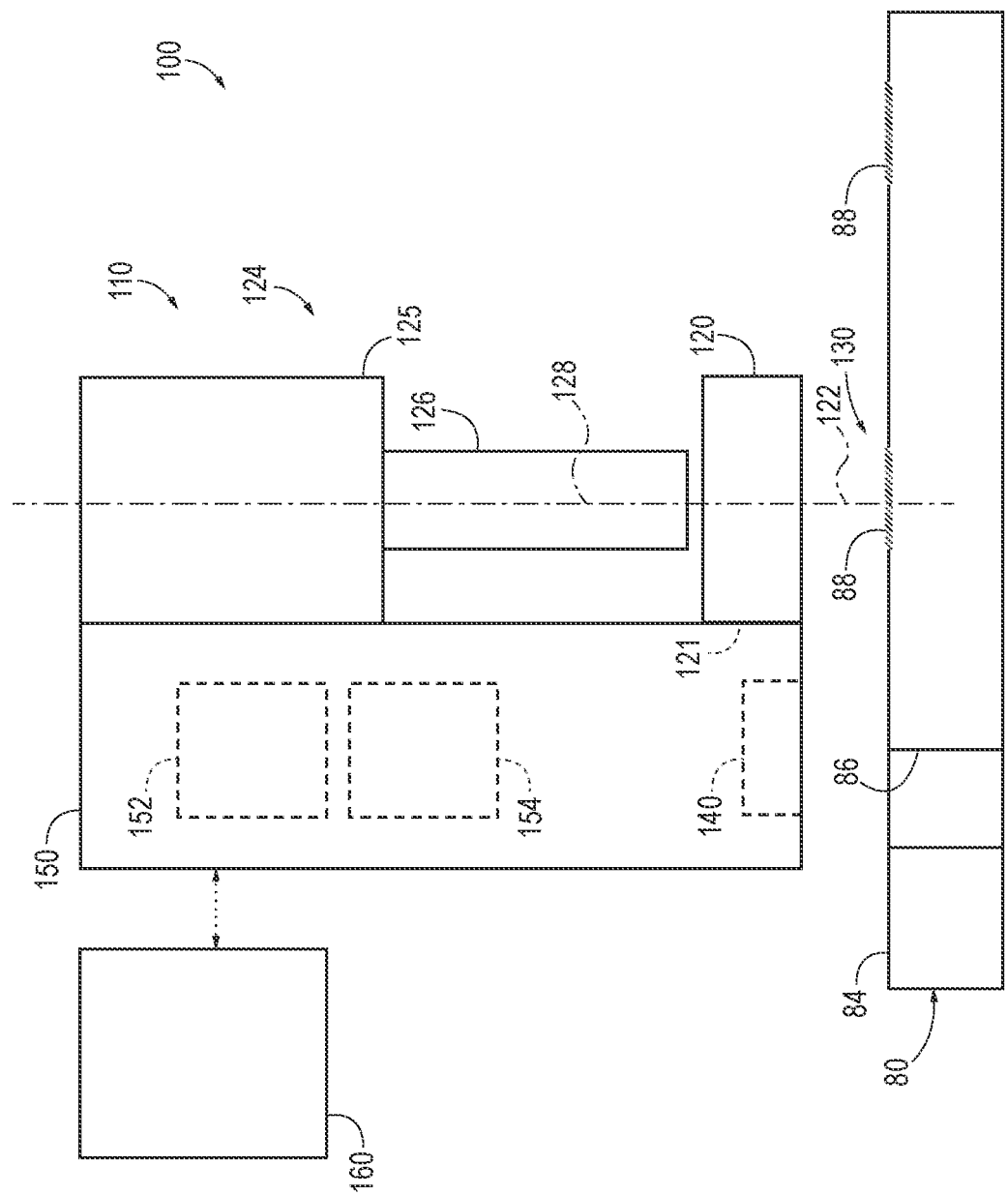
FIG. 8 is a schematic illustration of examples of robotic systems, according to the present disclosure.
Figure 9:
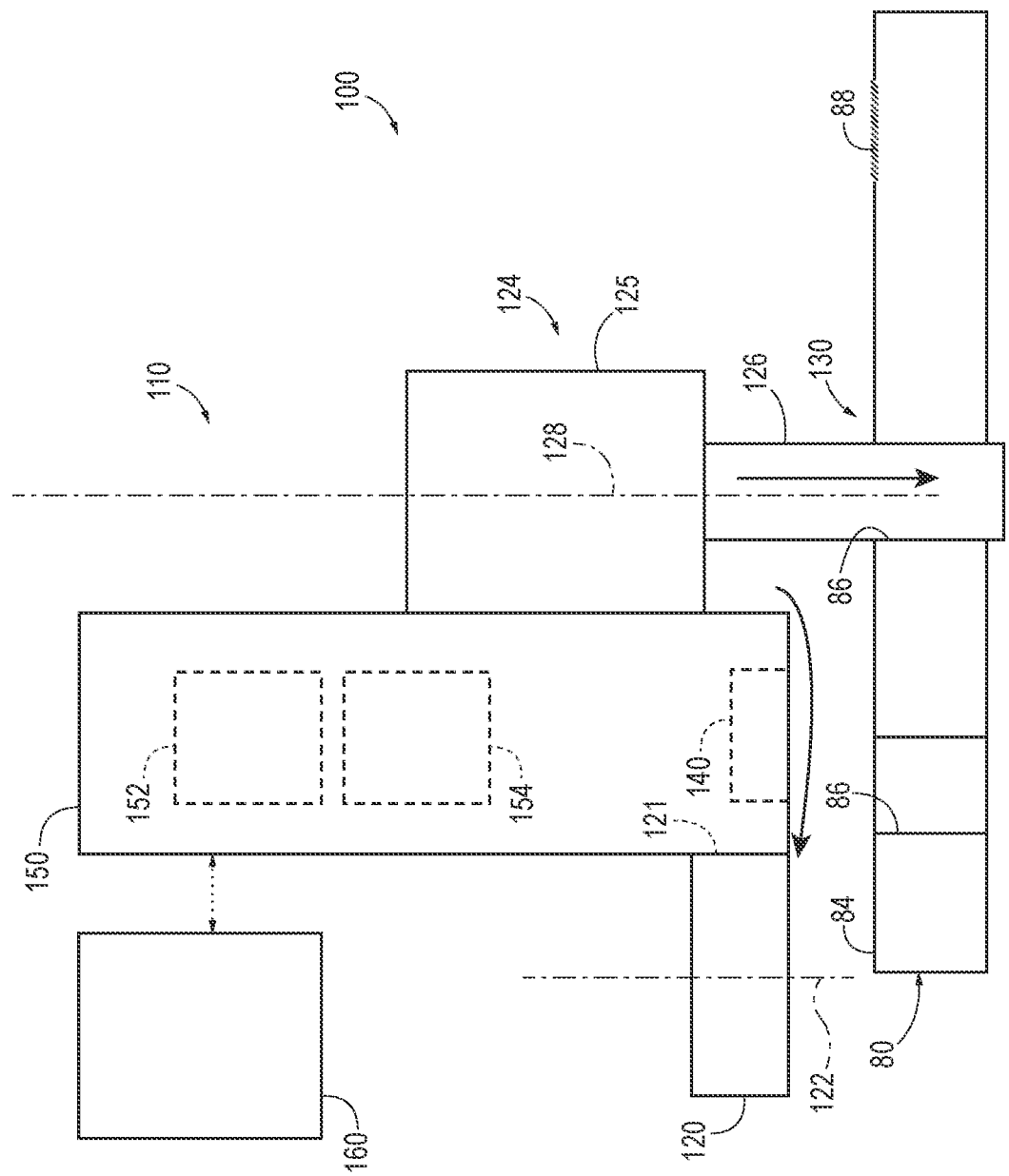
FIG. 9 is another schematic illustration of examples of robotic systems, according to the present disclosure.

FIGS. 8-9 are schematic illustrations of examples of robotic systems 100, according to the present disclosure. Robotic systems 100 may be configured to accurately and/or precisely perform a plurality of operations on a composite part 80 that includes a plurality of imprinted features 88.

As illustrated in FIGS. 8-9, robotic systems 100 include an end effector 110. End effector 110 includes a vision system 120, which is configured to detect a corresponding imprinted feature 88 on a surface 84 of composite part 80. The corresponding imprinted feature 88 has an isotropic feature surface finish with a roughness that is greater than a surface roughness of a remainder of composite part 80. End effector 110 also includes an operating assembly 124, which is configured to perform the plurality of operations on composite part 80.

Robotic systems 100 also include a positioning system 150. Positioning system 150 is configured to position end effector 110 relative to composite part 80.

Robotic systems 100 also include a controller 160. Controller 160 is programmed to control the operation of robotic systems 100 such that robotic systems 100 perform each operation of the plurality of operations at a corresponding operation location 130 that corresponds to a location of the corresponding imprinted feature 88. In some examples, and as illustrated in FIGS. 8-9, controller 160 may control robotic systems 100 such that the corresponding operation location 130 is on and/or at the corresponding imprinted feature 88. In some examples, controller 160 may control robotic systems 100 such that the corresponding operation location 130 is offset from, or has a consistent offset from, the corresponding imprinted feature 88.

In some examples, and as illustrated in dashed lines in FIGS. 8-9, positioning system 150 may include a rough positioning system 152 and a fine positioning system 154. In such examples, controller 160 may be programmed to position end effector 110 proximate corresponding imprinted feature 88 utilizing rough positioning system 152 and to, or then to, refine the position of end effector 110 relative to corresponding imprinted feature 88 utilizing fine positioning system 154. Examples of rough positioning system 152 and/or of fine positioning system 154 include a mechanical positioning device, an electromechanical positioning device, an electrical positioning device, a linear actuator, a rack and pinion assembly, a lead screw and nut assembly, a ball screw and nut assembly, a motor, a linear motor, a stepper motor, a servo motor, and/or a piezoelectric element. In some examples, positioning system 150, rough positioning system 152, and/or fine positioning system 154 may be configured to position, to move, and/or to rotate end effector 110 along and/or about one axis, along and/or about two perpendicular axes, and/or along and/or about three orthogonal axes.

Rough positioning system 152 and fine positioning system 154 may have and/or define any suitable relative accuracy. As examples, rough positioning system 152 may have a positioning accuracy of at least 100 μm, at least 90 μm, at least 80 μm, at least 70 μm, or at least 60 μm. As additional examples, fine positioning system 154 may have a positioning accuracy of at least 40 μm, at least 35 μm, at least 30 μm, at least 25 μm, at least 20 μm, at least 15 μm, or at least 10 μm. In some examples, a ratio of a positioning accuracy of fine positioning system 154 to a positioning accuracy of rough positioning system 152 may be at least 2, at least 3, at least 4, at least 5, at least 6, at least 8, or at least 10.

In some examples, operating assembly 124 may include and/or be a drilling assembly 125. Drilling assembly 125 may include a drill bit 126 and/or may be configured to define a plurality of fastener holes 86 within composite part 80. Stated differently, and when operating assembly 124 includes drilling assembly 125, the plurality of operations performed by robotic system 100 may include drilling the plurality of fastener holes 86 within composite part 80.

In some such examples, vision system 120 may be configured to view corresponding imprinted feature 88 along an optical axis 122, as illustrated in FIG. 8. Also in some such examples, drilling assembly 125 may be configured to define a corresponding fastener hole 86 by extending drill bit 126 along a drilling axis 128, as illustrated by the transition from the configuration that is illustrated in FIG. 8 to the configuration that is illustrated in FIG. 9. Also in some such examples, optical axis 122 may be coaxial, or at least substantially coaxial, with drilling axis 128, at least when vision system 120 views corresponding imprinted feature 88 and/or when vision system 120 is utilized to align operating assembly 124 with corresponding imprinted feature 88. To permit and/or to facilitate such a configuration, vision system 120 may be configured to move and/or to pivot such that optical axis 122 is coaxial with drilling axis 128 during the alignment and also to move and/or pivot such that optical axis 122 is spaced-apart from drilling axis 128 when drill bit 126 is extended into composite part 80, as illustrated by the transition between the configuration that is illustrated in FIG. 8 and the configuration that is illustrated in FIG. 9. This motion and/or pivoting of vision system 120 may be performed utilizing a pivot mechanism 121 of vision system 120.

In some examples, and as illustrated in dashed lines in FIGS. 8-9, robotic system 100 may include a normality detection system 140. Normality detection system 140 may be configured to detect an orientation, or an angular orientation, of operating assembly 124 and/or of drilling assembly 125 relative to surface 84 of composite part 80. In some examples, normality detection system 140 and/or controller 160 may align operating assembly 124 and/or drilling assembly 125 normal to surface 84 utilizing information from normality detection system 140. In some examples, normality detection system 140 and/or controller 160 may align operating assembly 124 and/or drilling assembly 125 at a specified and/or predetermined angle relative to surface 84. Examples of normality detection system 140 include at least three spaced-apart lasers and/or at least three spaced-apart mechanical actuators, which may be utilized to detect alignment and/or normality between surface 84 and operating assembly 124.

As discussed, robotic systems 100 and/or vision systems 120 thereof may be adapted, configured, designed, and/or constructed to detect imprinted features 88 that have an isotropic feature surface finish with a roughness that is greater than a roughness of a remainder of composite part 80, such as a region of surface 84 that is external imprinted features 88. It is within the scope of the present disclosure that the roughness of imprinted features 88 may have and/or define any suitable roughness value. As examples, imprinted features 88 may define a roughness average (Ra) roughness of at least 0.5 μm, at least 0.6 μm, at least 0.7 μm, at least 0.8 μm, at least 0.9 μm, at least 1 μm, at least 1.2 μm, at least 1.4 μm, at least 1.6 μm, at least 1.8 μm, at least 2 μm, at least 2.2 μm, at least 2.4 μm, at least 2.6 μm, at least 2.8 μm, at least 3 μm, at least 3.175 μm, at least 3.2 μm, at least 3.4 μm, at least 3.6 μm, at least 3.8 μm, at least 4 μm, at least 4.2 μm, at least 4.4 μm, at least 4.6 μm, at least 4.8 μm, at least 5 μm, at least 5.2 μm, at least 5.4 μm, at least 5.6 μm, at least 5.8 μm, at least 6 μm, at most 15 μm, at most 14 μm, at most 13 μm, at most 12 μm, at most 11 am, at most 10 μm, at most 9 μm, at most 8 μm, at most 7.8 μm, at most 7.6 μm, at most 7.4 μm, at most 7.2 μm, at most 7 μm, at most 6.8 μm, at most 6.6 μm, at most 6.4 μm, at most 6.3 μm, at most 6.2 μm, at most 6 μm, at most 5.8 μm, at most 5.6 μm, at most 5.4 μm, at most 5.2 μm, at most 5 μm, at most 4.8 μm, at most 4.6 μm, at most 4.4 μm, at most 4.2 μm, at most 4 μm, at most 3.8 μm, at most 3.6 μm, at most 3.4 μm, at most 3.2 μm, and/or at most 3 μm.

It is also within the scope of the present discourse that the roughness of imprinted features 88 may differ from the roughness of the remainder of composite part 80 in any suitable manner. As examples, a roughness ratio of the Ra roughness of imprinted features 88 to the Ra roughness of the remainder of composite part 80 may be at least 1.1, at least 1.2, at least 1.3, at least 1.4, at least 1.5, at least 1.6, at least 1.7, at least 1.8, at least 1.9, at least 2, at least 2.1, at least 2.2, at least 2.3, at least 2.4, at least 2.5, at least 2.6, at least 2.7, at least 2.8, at least 2.9, at least 3, at most 5, at most 4.8, at most 4.6, at most 4.4, at most 4.2, at most 4, at most 3.8, at most 3.6, at most 3.4, at most 3.2, at most 3, at most 2.8, at most 2.6, at most 2.4, at most 2.2, at most 2, at most 1.8, at most 1.6, and/or at most 1.4. The roughness of imprinted features 88 may include and/or be an isotropic surface finish roughness, examples of which are disclosed herein.

Figure 10:
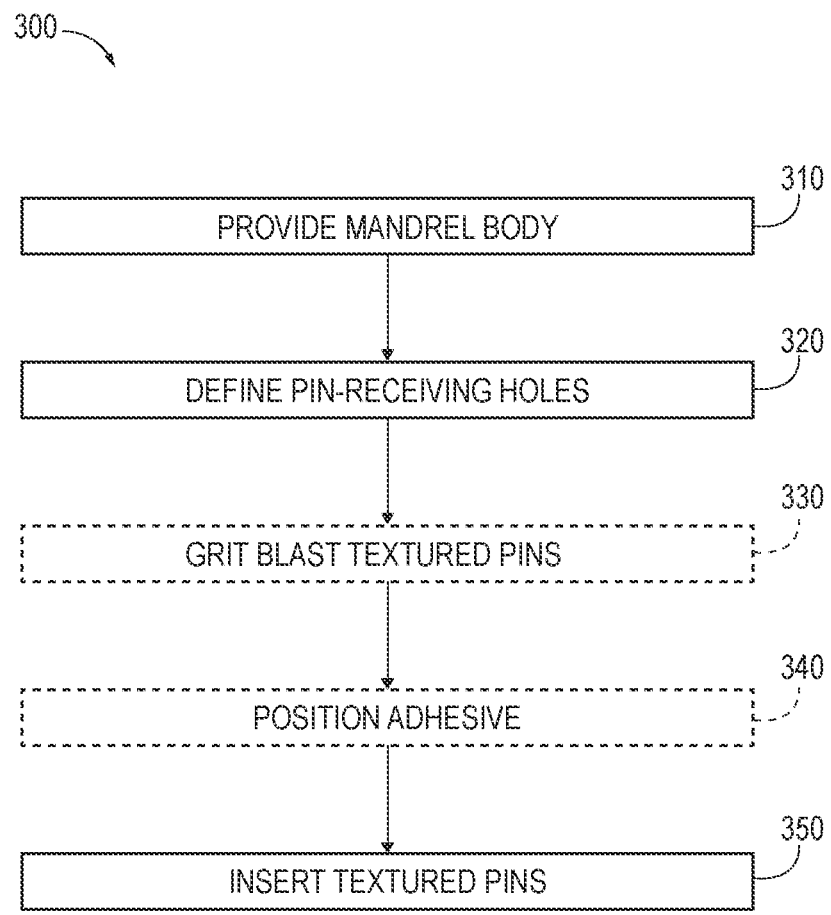
FIG. 10 is a flowchart depicting examples of methods of manufacturing a layup mandrel for a composite part, according to the present disclosure.

FIG. 10 is a flowchart depicting examples of methods 300 of manufacturing a layup mandrel for a composite part, according to the present disclosure. Examples of the layup mandrel are disclosed herein with reference to layup mandrel 200. Examples of the composite part are disclosed herein with reference to composite part 80.

Methods 300 include providing a mandrel body at 310 and defining pin-receiving holes at 320. Methods 300 also may include grit blasting textured pins at 330 and/or positioning adhesive at 340 and inserting textured pins at 350.

Providing the mandrel body at 310 may include providing any suitable mandrel body that defines a layup surface. The layup surface may be configured to receive a plurality of plies of composite material and/or to define a surface contour for the composite part. Examples of the mandrel body are disclosed herein with reference to mandrel body 210.

Defining the pin-receiving holes at 320 may include forming, defining, and/or establishing a plurality of pin-receiving holes within the mandrel body. Each pin-receiving hole may extend from the layup surface into the mandrel body. Examples of the pin-receiving holes are disclosed herein with reference to pin-receiving holes 214.

The defining at 320 may be performed in any suitable manner, such as via any suitable additive and/or subtractive machining and/or manufacturing process. In a specific example, the defining at 320 may include drilling the plurality of pin-receiving holes in and/or within the mandrel body. In some examples, the defining at 320 may include defining a plurality of blind pin-receiving holes.

As discussed in more detail herein, the composite part may be configured to be utilized within a composite part assembly. In such examples, within the composite part assembly, the composite part may include a plurality of fastener holes, and a corresponding fastener may extend within each fastener hole to retain the composite part within the composite part assembly. Also in such examples, the defining at 320 may include positioning the plurality of pin-receiving holes such that, subsequent to the inserting, a location of each textured pin of the plurality of textured pins corresponds to a location of, or to a desired location for, a fastener hole of the plurality of fastener holes.

Grit blasting the textured pins at 330 may include grit blasting the plurality of textured pins, such as the end surfaces thereof, to form and/or define the isotropically textured pin end surface. This may include grit blasting the plurality of textured pins prior to the inserting at 350.

Positioning the adhesive at 340 may include positioning any suitable adhesive, or adhesive material, in and/or within each pin-receiving hole. This may include positioning the adhesive material such that the adhesive material adhesively retains each textured pin of the plurality of textured pins within the corresponding pin-receiving hole. The positioning at 340 may be performed prior to the inserting at 350.

Inserting the textured pins at 350 may include inserting a textured pin of a plurality of textured pins into a corresponding pin-receiving hole of the plurality of pin-receiving holes. The textured pin may include a textured pin end. The textured pin end may define an isotropically textured pin end surface, and the inserting at 350 may include inserting such that the isotropically textured pin end surface faces away from the layup mandrel. Examples of the textured pin are disclosed herein with reference to textured pin 230. Examples of the textured pin end are disclosed herein with reference to textured pin end 232.

In some examples, the inserting at 350 may include inserting such that the textured pin end is coplanar, or at least substantially coplanar, with a region of the layup surface that defines the corresponding pin-receiving hole and/or with an opening into the corresponding pin-receiving hole that is defined by the layup surface. In some examples, the inserting at 350 may include inserting such that the corresponding textured pin end is within a threshold pin end offset distance of the region of the layup surface that defines the corresponding pin-receiving hole and/or of the opening into the corresponding pin-receiving hole that is defined by the layup surface. Examples of the threshold pin end offset distance are disclosed herein with reference to threshold pin end offset distance 250.

In a specific example of methods 300, the textured pins already may be formed and may be configured for a friction fit within the pin-receiving holes. In such an example, methods 300 include providing the mandrel body via the providing at 310, defining the pin-receiving holes via the defining at 320, and inserting the textured pins into the pin-receiving holes via the inserting at 350. In another specific example of methods 300, pins without textured ends may be provided and these pins may be configured for a slip-fit within the pin-receiving holes. In such an example, methods 300 include providing the mandrel body via the providing at 310, defining the pin-receiving holes via the defining at 320, grit blasting to define the textured pin ends via the grit blasting at 330, positioning adhesive within the pin-receiving holes via the positioning at 340, and inserting the textured pins into the pin-receiving holes via the inserting at 350. Other combinations of the steps of methods 300 also are within the scope of the present disclosure.

Figure 11:
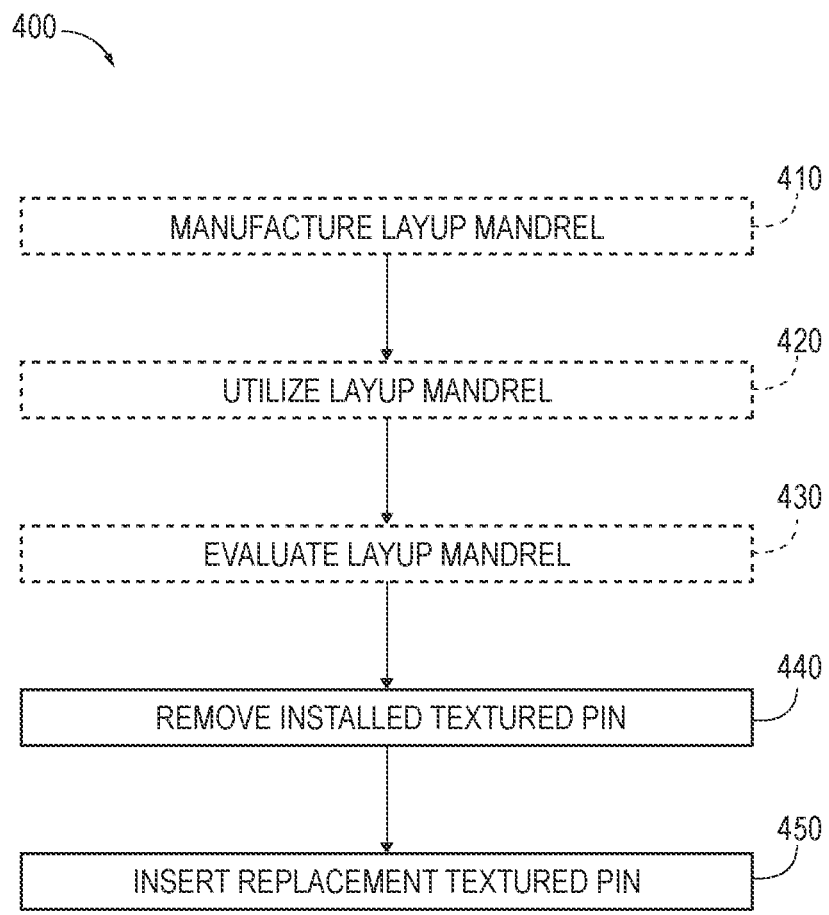
FIG. 11 is a flowchart depicting examples of methods of repairing a damaged layup mandrel, according to the present disclosure.

FIG. 11 is a flowchart depicting examples of methods 400 of repairing a damaged layup mandrel, according to the present disclosure. Examples of the layup mandrel are disclosed herein with reference to layup mandrel 200.

Methods 400 may include manufacturing the layup mandrel at 410, utilizing the layup mandrel at 420, and/or evaluating the layup mandrel at 430. Methods 400 further include removing an installed textured pin at 440 and inserting a replacement textured pin at 450.

Manufacturing the layup mandrel at 410 may include forming, defining, and/or creating the layup mandrel in any suitable manner. As an example, the manufacturing at 410 may include performing any suitable step and/or steps of methods 300, which are disclosed herein.

Utilizing the layup mandrel at 420 may include utilizing the layup mandrel to form and/or define a composite part. As an example, the utilizing at 420 may include performing any suitable step and/or steps of methods 500, which are disclosed herein. Examples of the composite part are disclosed herein with reference to composite part 80. The utilizing at 420 may be performed subsequent to the manufacturing at 410 and/or prior to the evaluating at 430, prior to the removing at 440, and/or prior to the inserting at 450.

Evaluating the layup mandrel at 430 may include evaluating and/or scrutinizing the layup mandrel in any suitable manner and/or based upon any suitable criteria. As an example, the evaluating at 430 may include establishing that the layup mandrel fails to meet at least one specification, such as may be subsequent to the manufacturing at 410 and/or subsequent to the utilizing at 420. As another example, the evaluating at 430 may include quantifying wear of the layup mandrel, such as may be caused by the utilizing at 420. Stated differently, and during the utilizing at 420, one or more components of the layup mandrel may become worn and/or damaged, thereby causing the one or more components of the layup mandrel to be outside an applicable specification, and the evaluating at 430 may be utilized to detect, to quantify, and/or to determine the extent of this wear and/or damage. When methods 400 include the evaluating at 430, the removing at 440 may be performed at least partially responsive to the evaluating at 430. As examples, the removing at 440 may be performed responsive to the layup mandrel failing to meet the at least one specification and/or responsive to the wear of the layup mandrel.

Removing the installed textured pin at 440 may include removing the installed textured pin from a corresponding pin-receiving hole that extends from a layup surface of the damaged layup mandrel into a mandrel body of the damaged layup mandrel. Examples of the installed textured pin are disclosed herein with reference to textured pin 230. Examples of the pin-receiving hole are disclosed herein with reference to pin-receiving hole 214. Examples of the layup surface are disclosed herein with reference to layup surface 212. Examples of the mandrel body are disclosed herein with reference to mandrel body 210.

The removing at 440 may be performed in any suitable manner. As an example, the removing at 440 may include pulling the installed textured pin from the corresponding pin-receiving hole. As another example, the removing at 440 may include drilling an extraction hole within the installed textured pin, positioning a pin extractor within the extraction hole, and pulling the installed textured pin from the corresponding pin-receiving hole, such as via utilizing the pin extractor.

Inserting the replacement textured pin at 450 may include inserting the replacement textured pin into the corresponding pin-receiving hole to define a repaired layup mandrel. The replacement textured pin may have a textured pin end that defines an isotropically textured pin end surface, and the inserting at 450 may include inserting such that the isotropically textured pin end faces away from the layup mandrel. Examples of the repaired layup mandrel are disclosed herein with reference to layup mandrel 200. Examples of the replacement textured pin are disclosed herein with reference to textured pin 230. The inserting at 450 may be performed in any suitable manner, including manners that are disclosed herein with reference to the inserting at 350 that is described with reference to methods 300.

FIG. 12 is a flowchart depicting examples of methods 500 of forming a composite part, according to the present disclosure. The composite part includes a plurality of imprinted features, which is configured to indicate, to a robotic drilling system, a location for a fastener hole within the composite part. Examples of the composite part are disclosed herein with reference to composite part 80. Examples of the imprinted features are disclosed herein with reference to imprinted features 88. Examples of the robotic drilling system are disclosed herein with reference to robotic system 100. Examples of the fastener hole are disclosed herein with reference to fastener hole 86. Methods 500 include positioning plies at 510, conforming the plies at 520, and curing the plies at 530.

Positioning the plies at 510 may include positioning a plurality of plies of composite material on a layup mandrel. The layup mandrel may include a mandrel body that defines a layup surface. The layup surface may define a layup surface finish roughness. The layup mandrel also may include a plurality of regions of isotropic surface finish spaced-apart on the layup surface. The isotropic surface finish may define an isotropic surface finish roughness that is greater than the layup surface finish roughness, and a location of each region of isotropic surface finish may correspond to a desired location for a corresponding fastener hole within the composite part. Examples of the plurality of plies are disclosed herein with reference to plies 82. Examples of the layup surface are disclosed herein with reference to layup surface 212. Examples of the plurality of regions of isotropic surface finish are disclosed herein with reference to regions 236.

Conforming the plies at 520 may include conforming the plurality of plies of composite material to a layup surface shape of the layup surface. This may be performed in any suitable manner. As an example, the conforming at 520 may include vacuum bagging the plurality of plies of composite material to compress the plurality of plies of composite material to the layup surface.

The conforming at 520 also includes imprinting, within at least a mandrel-contacting ply of the plurality of plies of composite material. The imprinting includes imprinting the layup surface finish roughness within regions of the mandrel-contacting ply that contact the layup surface. The imprinting also includes imprinting the isotropic surface finish roughness within regions of the mandrel-contacting ply that contact the plurality of regions of isotropic surface finish.

Curing the plies at 530 may include curing the plurality of plies of composite material to form and/or define the composite part. Subsequent to the curing, the composite part may include the plurality of spaced-apart imprinted features, and a location of each spaced-apart imprinted feature may correspond to a location of a corresponding region of isotropic surface finish of the plurality of regions of isotropic surface finish.

Figure 13:
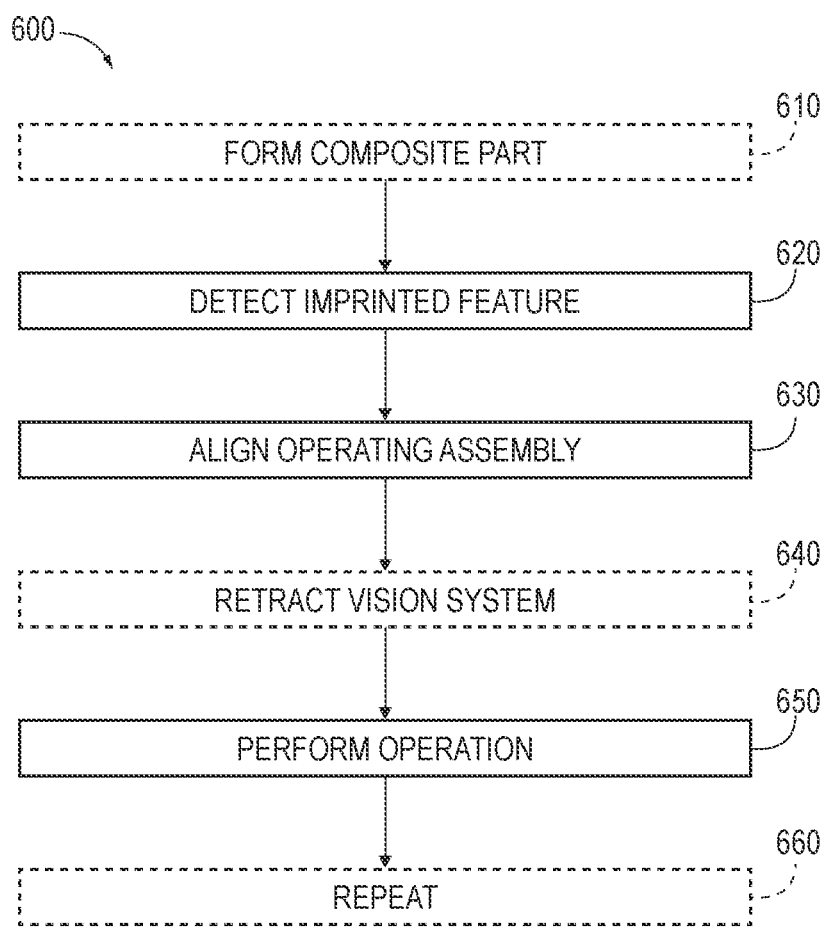
FIG. 13 is a flowchart depicting examples of methods of precisely performing a plurality of operations on a composite part, according to the present disclosure.

FIG. 13 is a flowchart depicting examples of methods 600 of precisely performing a plurality of operations on a composite part, according to the present disclosure. The composite part includes a plurality of imprinted features defined on a surface of the composite part. Examples of the composite part are disclosed herein with reference to composite part 80. Examples of the imprinted features are disclosed herein with reference to imprinted features 88. Examples of the surface of the composite part are disclosed herein with reference to surface 84.

Methods 600 may include forming the composite part at 610, detecting an imprinted feature at 620, and aligning an operating assembly at 630. Methods 600 further may include retracting a vision system at 640 and performing an operation at 650. Methods 600 also may include repeating at 660.

Forming the composite part at 610 may include forming and/or defining the composite part in any suitable manner. As an example, the forming at 610 may include performing any suitable step and/or steps of methods 500, which are disclosed herein.

Detecting the imprinted feature at 620 may include detecting a corresponding imprinted feature of the plurality of imprinted features. The imprinted feature has an isotropic surface finish with a roughness that is greater than a surface roughness of a remainder of the composite part. The detecting at 620 may be performed utilizing a vision system of an end effector of a robotic system. Examples of the vision system are disclosed herein with reference to vision system 120. Examples of the end effector are disclosed herein with reference to end effector 110. Examples of the robotic system are disclosed herein with reference to robotic system 100.

Aligning the operating assembly at 630 may include aligning an operating assembly of the end effector relative to the corresponding imprinted feature and may be based, at least in part, on the detecting at 620. This may include aligning the operating assembly utilizing a positioning system of the robotic system. Examples of the positioning system are disclosed herein with reference to positioning system 150.

In some examples, the aligning at 630 may include roughly positioning the end effector relative to the corresponding imprinted feature utilizing a rough positioning system of the positioning system. In some such examples, the aligning at 630 also may include finely positioning the end effector relative to the corresponding imprinted feature utilizing a fine positioning system of the positioning system. Examples of the rough positioning system are disclosed herein with reference to rough positioning system 152. Examples of the fine positioning system are disclosed herein with reference to fine positioning system 154.

In some examples, the aligning at 630 may include utilizing the vision system to view the corresponding imprinted feature. In some examples, the operating assembly may include a drilling assembly configured to define a plurality of fastener holes in the composite part. In some such examples, the aligning at 630 may include aligning such that a drilling axis of the drilling assembly is normal to the surface of the composite part, is at a predetermined angle relative to the surface of the composite part, and/or is coaxial with an optical axis of the vision system. In some such examples, the aligning at 630 may include utilizing a normality detection system of the end effector to determine an angle between the drilling axis and the surface of the composite part. Examples of the drilling assembly are disclosed herein with reference to drilling assembly 125. Examples of the drilling axis are disclosed herein with reference to drilling axis 128. Examples of the optical axis are disclosed herein with reference to optical axis 122. Examples of the normality detection system are disclosed herein with reference to normality detection system 140.

Retracting the vision system at 640 may include moving the vision system away from the drilling axis. Stated differently, and when the aligning at 630 includes aligning such that the optical axis of the vision system is coaxial with the drilling axis of the drilling assembly, the vision system may be positioned between the drilling assembly and the surface of the composite part during the aligning at 630. In such examples, the retracting at 640 may be utilized to permit, or to provide space for, the performing at 650. In addition, and in such examples, the retracting at 640 may permit transitioning from the aligning at 630 to the performing at 650 without moving the drilling assembly, thereby improving an overall accuracy of methods 600.

Performing the operation at 650 may include performing a corresponding operation of the plurality of operations on the composite part and/or proximate the corresponding imprinted feature. When the operating assembly includes the drilling assembly, the performing at 650 may include drilling a corresponding hole in the composite part. In some examples, the performing at 650 may include performing the corresponding operation on and/or within the corresponding imprinted feature. In some such examples, the performing at 650 may include removing the corresponding imprinted feature from the composite part. In other examples, the performing at 650 may include performing the corresponding operation at a predetermined location relative to the corresponding imprinted feature. In some such examples, the corresponding imprinted feature may include and/or be a fly-away feature that may be acceptable in the finished composite part and/or in a composite part assembly that includes and/or utilizes the composite part.

Repeating at 660 may include repeating any suitable step and/or steps of methods 600 in any suitable manner and/or for any suitable purpose. As an example, the repeating at 660 may include repeating to perform the plurality of operations on the composite part and/or to perform the plurality of operations at locations of the plurality of imprinted features on the composite part.

Illustrative, non-exclusive examples of inventive subject matter according to the present disclosure are described in the following enumerated paragraphs:

A1. A layup mandrel (200) for a composite part (80), the layup mandrel (200) comprising:

a mandrel body (210) that defines:

(i) a layup surface (212) configured to receive a plurality of plies (82) of composite material to define a surface contour of the composite part (80); and (ii) a plurality of pin-receiving holes (214), wherein each pin-receiving hole (214) of the plurality of pin-receiving holes (214) extends from the layup surface (212) and into the mandrel body (210); and a plurality of textured pins (230), wherein each textured pin (230) of the plurality of textured pins (230):

(i) is positioned within a corresponding pin-receiving hole (214) of the plurality of pin-receiving holes (214); and (ii) has a textured pin end (232) that defines an isotropically textured pin end surface that faces away from the layup mandrel (200).

A2. The layup mandrel (200) of paragraph A1, wherein each textured pin (230) of the plurality of textured pins (230) is sized for a friction fit within the corresponding pin-receiving hole (214).

A3. The layup mandrel (200) of any of paragraphs A1-A2, wherein each textured pin (230) of the plurality of textured pins (230) includes a cylindrical, or at least substantially cylindrical, pin region.

A4. The layup mandrel (200) of any of paragraphs A1-A3, wherein each textured pin (230) of the plurality of textured pins (230) defines a pin diameter (238), an average pin diameter, or an effective pin diameter of at least one of:

(i) at least 2 millimeters (mm), at least 2.2 mm, at least 2.4 mm, at least 2.6 mm, at least 2.8 mm, at least 3 mm, at least 3.2 mm, at least 3.4 mm, at least 3.6 mm, at least 3.8 mm, at least 4 mm, at least 4.2 mm, at least 4.4 mm, at least 4.6 mm, at least 4.8 mm, or at least 5 mm;

(ii) at most 8 mm, at most 7.8 mm, at most 7.6 mm, at most 7.4 mm, at most 7.2 mm, at most 7 mm, at most 6.8 mm, at most 6.6 mm, at most 6.4 mm, at most 6.2 mm, at most 6 mm, at most 5.8 mm, at most 5.6 mm, at most 5.4 mm, at most 5.2 mm, at most 5 mm, at most 4.8 mm, at most 4.6 mm, at most 4.4 mm, at most 4.2 mm, or at most 4 mm; and (iii) 4.7625 mm.

A5. The layup mandrel (200) of any of paragraphs A1-A4, wherein each textured pin (230) of the plurality of textured pins (230) defines a pin length (240), or an average pin length, of at least one of:

(i) at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, or at least 13 mm; and (ii) at most 20 mm, at most 19 mm, at most 18 mm, at most 17 mm, at most 16 mm, at most 15 mm, at most 14 mm, at most 13 mm, at most 12 mm, at most 11 mm, at most 10 mm, at most 9 mm, at most 8 mm, at most 7 mm, or at most 6 mm.

A6. The layup mandrel (200) of any of paragraphs A1-A5, wherein the textured pin end (232) is a circular, or at least substantially circular, textured pin end.

A7. The layup mandrel (200) of any of paragraphs A1-A6, wherein the textured pin end (232) is a planar, or at least substantially planar, textured pin end.

A8. The layup mandrel (200) of any of paragraphs A1-A7, wherein the textured pin end (232) extends perpendicular, or at least substantially perpendicular, to an elongate axis of each textured pin (230).

A9. The layup mandrel (200) of any of paragraphs A1-A8, wherein the textured pin end (232) is an abrasive grit blasted textured pin end.

A10. The layup mandrel (200) of any of paragraphs A1-A9, wherein the textured pin end (232) has a roughness average (Ra) roughness of at least one of:
(i) at least 0.5 micrometers (μm), at least 0.6 μm, at least 0.7 μm, at least 0.8 μm, at least 0.9 μm, at least 1 μm, at least 1.2 μm, at least 1.4 μm, at least 1.6 μm, at least 1.8 μm, at least 2 μm, at least 2.2 μm, at least 2.4 μm, at least 2.6 μm, at least 2.8 μm, at least 3 μm, at least 3.175 μm, at least 3.2 μm, at least 3.4 μm, at least 3.6 μm, at least 3.8 μm, at least 4 μm, at least 4.2 μm, at least 4.4 μm, at least 4.6 μm, at least 4.8 μm, at least 5 μm, at least 5.2 μm, at least 5.4 μm, at least 5.6 μm, at least 5.8 μm, or at least 6 μm; and
(ii) at most 15 μm, at most 14 μm, at most 13 μm, at most 12 μm, at most 11 μm, at most 10 μm, at most 9 μm, at most 8 μm, at most 7.8 μm, at most 7.6 μm, at most 7.4 μm, at most 7.2 μm, at most 7 μm, at most 6.8 μm, at most 6.6 μm, at most 6.4 μm, at most 6.3 μm, at most 6.2 μm, at most 6 μm, at most 5.8 μm, at most 5.6 μm, at most 5.4 μm, at most 5.2 μm, at most 5 μm, at most 4.8 μm, at most 4.6 μm, at most 4.4 μm, at most 4.2 μm, at most 4 μm, at most 3.8 μm, at most 3.6 μm, at most 3.4 μm, at most 3.2 μm, or at most 3 μm.

A11. The layup mandrel (200) of any of paragraphs A1-A10, wherein a roughness ratio of a/the Ra roughness of the textured pin end (232) to a Ra roughness of the layup surface (212) is at least one of:
(i) at least 1.1, at least 1.2, at least 1.3, at least 1.4, at least 1.5, at least 1.6, at least 1.7, at least 1.8, at least 1.9, at least 2, at least 2.1, at least 2.2, at least 2.3, at least 2.4, at least 2.5, at least 2.6, at least 2.7, at least 2.8, at least 2.9, or at least 3; and
(ii) at most 5, at most 4.8, at most 4.6, at most 4.4, at most 4.2, at most 4, at most 3.8, at most 3.6, at most 3.4, at most 3.2, at most 3, at most 2.8, at most 2.6, at most 2.4, at most 2.2, at most 2, at most 1.8, at most 1.6, or at most 1.4.

A12. The layup mandrel (200) of any of paragraphs A1-A11 wherein the textured pin end (232) is coplanar, or at least substantially coplanar, with at least one of:
(i) a region of the layup surface (212) that defines the corresponding pin-receiving hole (214); and
(ii) an opening into the corresponding pin-receiving hole (214) that is defined by the layup surface (212).

A13. The layup mandrel (200) of any of paragraphs A1-A12, wherein the textured pin end (232) is within a threshold pin end offset distance (250) of at least one of:
(i) a/the region of the layup surface (212) that defines the corresponding pin-receiving hole (214); and
(ii) an/the opening into the corresponding pin-receiving hole (214) that is defined by the layup surface (212).

A14. The layup mandrel (200) of any of paragraphs A1-A13, wherein the threshold pin end offset distance (250) is at most 1 mm, at most 0.9 mm, at most 0.8 mm, at most 0.7 mm, at most 0.6 mm, at most 0.5 mm, at most 0.4 mm, at most 0.3 mm, at most 0.2 mm, at most 0.1 mm, at most 90 μm, at most 80 μm, at most 70 μm, at most 60 μm, at most 55 μm, at most 50 μm, at most 45 μm, at most 40 μm, at most 35 μm, at most 30 μm, at most 25 μm, at most 20 μm, at most 15 μm, at most 10 μm, or at most 5 μm.

A15. The layup mandrel (200) of any of paragraphs A1-A14, wherein each pin-receiving hole (214) of the plurality of pin-receiving holes (214) defines a hole diameter (216), an average hole diameter, or an effective hole diameter of at least one of:
(i) at least 2 mm, at least 2.2 mm, at least 2.4 mm, at least 2.6 mm, at least 2.8 mm, at least 3 mm, at least 3.2 mm, at least 3.4 mm, at least 3.6 mm, at least 3.8 mm, at least 4 mm, at least 4.2 mm, at least 4.4 mm, at least 4.6 mm, at least 4.8 mm, or at least 5 mm;
(ii) at most 8 mm, at most 7.8 mm, at most 7.6 mm, at most 7.4 mm, at most 7.2 mm, at most 7 mm, at most 6.8 mm, at most 6.6 mm, at most 6.4 mm, at most 6.2 mm, at most 6 mm, at most 5.8 mm, at most 5.6 mm, at most 5.4 mm, at most 5.2 mm, at most 5 mm, at most 4.8 mm, at most 4.6 mm, at most 4.4 mm, at most 4.2 mm, or at most 4 mm; and
(iii) 4.7625 mm.

A16. The layup mandrel (200) of any of paragraphs A1-A15, wherein each pin-receiving hole (214) of the plurality of pin-receiving holes (214) defines a hole depth (218), or an average hole depth, of at least one of:
(i) at least 1 mm, at least 2 mm, at least 3 mm, at least 4 mm, at least 5 mm, at least 6 mm, at least 7 mm, at least 8 mm, at least 9 mm, at least 10 mm, at least 11 mm, at least 12 mm, or at least 13 mm; and
(ii) at most 15 mm, at most 14.5 mm, at most 14 mm, at most 13.5 mm, at most 13 mm, at most 12.5 mm, or at most 12 mm.

A17. The layup mandrel (200) of any of paragraphs A1-A16, wherein the layup mandrel (200) further includes an adhesive material (260) positioned within the corresponding pin-receiving hole (214) and configured to adhesively retain each textured pin (230) within the corresponding pin-receiving hole (214).

A18. The layup mandrel (200) of any of paragraphs A1-A17, wherein the mandrel body (210) is defined by a mandrel body material, and further wherein the plurality of textured pins (230) is defined by a textured pin material.

A19. The layup mandrel (200) of paragraph A18, wherein the mandrel body material includes, or is, at least one of a polymer, a carbon-fiber-reinforced polymer, a metal, aluminum, an aluminum alloy, structural steel, a nickel-iron alloy, and 64FeNi.

A20. The layup mandrel (200) of any of paragraphs A18-A19, wherein the textured pin material includes, or is, at least one of a thermoplastic, a polyetheretherketone, a metal, a steel, a mild steel, and a stainless steel.

A21. The layup mandrel (200) of any of paragraphs A18-A20, wherein the textured pin material defines a textured pin material hardness that is greater than a mandrel body material hardness of the mandrel body material.

A22. The layup mandrel (200) of paragraph A21, wherein a ratio of the textured pin material hardness to the mandrel body material hardness is at least 1.02, at least 1.04, at least 1.06, at least 1.08, at least 1.1, at least 1.15, at least 1.2, at least 1.3, at least 1.4, or at least 1.5.

A23. The layup mandrel (200) of any of paragraphs A18-A22, wherein the textured pin material defines a textured pin material durability that is greater than a mandrel body material durability of the mandrel body material.

B1. A method (300) of manufacturing a layup mandrel (200) for a composite part (80), the method (300) comprising:

providing (310) a mandrel body (210), wherein the mandrel body (210) defines a layup surface (212) configured to receive a plurality of plies (82) of composite material to define a surface contour of the composite part (80);

defining (320) a plurality of pin-receiving holes (214) within the mandrel body (210), wherein each pin-receiving hole (214) of the plurality of pin-receiving holes (214) extends from the layup surface (212) and into the mandrel body (210); and inserting (350) a corresponding textured pin (230) of a plurality of textured pins (230) into a corresponding pin-receiving hole (214) of the plurality of pin-receiving holes (214), wherein the corresponding textured pin (230) has a textured pin end (232) that defines an isotropically textured pin end surface, and further wherein the inserting (350) includes inserting such that the isotropically textured pin end surface faces away from the layup mandrel (200).

B2. The method (300) of paragraph B1, wherein the defining (310) the plurality of pin-receiving holes (214) includes drilling the plurality of pin-receiving holes (214) within the mandrel body (210).

B3. The method (300) of any of paragraphs B1-B2, wherein the defining (310) the plurality of pin-receiving holes (214) includes defining a plurality of blind pin-receiving holes.

B4. The method (300) of any of paragraphs B1-B3, wherein the composite part (80) is configured to be utilized within a composite part assembly (10), wherein, within the composite part assembly (10), the composite part (80) includes a plurality of fastener holes (86), wherein, within the composite part assembly (10), a corresponding fastener (90) extends within each fastener hole (86) of the plurality of fastener holes (86) to retain the composite part (80) within the composite part assembly (10), and further wherein the defining (310) the plurality of pin-receiving holes (214) includes positioning the plurality of pin-receiving holes (214) such that, subsequent to the inserting (350), a location of each textured pin (230) of the plurality of textured pins (230) corresponds to a location of a fastener hole (86) of the plurality of fastener holes (86).

B5. The method (300) of any of paragraphs B1-B4, wherein the inserting (350) includes inserting such that the corresponding textured pin end (232) is coplanar, or at least substantially coplanar, with at least one of:
(i) a region of the layup surface (212) that defines the corresponding pin-receiving hole (214); and
(ii) an opening into the corresponding pin-receiving hole (214) that is defined by the layup surface (212).

B6. The method (300) of any of paragraphs B1-B5, wherein the inserting (350) includes inserting such that the corresponding textured pin end (232) is within a threshold pin end offset distance (250) of at least one of:
(i) a/the region of the layup surface (212) that defines the corresponding pin-receiving hole (214); and
(ii) an/the opening into the corresponding pin-receiving hole (214) that is defined by the layup surface (212).

B7. The method (300) of paragraph B6, wherein the threshold pin end offset distance (250) is at most 1 mm, at most 0.9 mm, at most 0.8 mm, at most 0.7 mm, at most 0.6 mm, at most 0.5 mm, at most 0.4 mm, at most 0.3 mm, at most 0.2 mm, at most 0.1 mm, at most 90 µm, at most 80 µm, at most 70 µm, at most 60 µm, at most 55 µm, at most 50 µm, at most 45 µm, at most 40 µm, at most 35 µm, at most 30 µm, at most 25 µm, at most 20 µm, at most 15 µm, at most 10 µm, or at most 5 µm.

B8. The method (300) of any of paragraphs B1-B7, wherein, prior to the inserting (350), the method (300) further includes grit blasting (330) the plurality of textured pins (230) to define the isotropically textured pin end surface.

B9. The method (300) of any of paragraphs B1-B8, wherein, prior to the inserting (350), the method (300) further includes positioning (340) an adhesive material (260) within each pin-receiving hole (214) of the plurality of pin-receiving holes (214) such that the adhesive material (260) adhesively retains each textured pin (230) of the plurality of textured pins (230) within the corresponding pin-receiving hole (214).

B10. The method (300) of any of paragraphs B1-B8, wherein the layup mandrel (200) includes any suitable structure, function, and/or feature of any of the layup mandrels (200) of any of paragraphs A1-A23.

C1. A method (400) of repairing a damaged layup mandrel (200), the method (400) comprising:

removing (440) an installed textured pin (230) from a corresponding pin-receiving hole (214) that extends from a layup surface (212) of the damaged layup mandrel (200) and into a mandrel body (210) of the damaged layup mandrel (200); and inserting (450) a replacement textured pin (230) into the corresponding pin-receiving hole (214) to define a repaired layup mandrel (200), wherein the replacement textured pin (230) has a replacement textured pin end (232) that defines an isotropically textured pin end surface, and further wherein the inserting (450) includes inserting such that the isotropically textured pin end surface faces away from the repaired layup mandrel (200).

C2. The method (400) of paragraph C1, wherein the removing (440) includes pulling the installed textured pin (230) from the corresponding pin-receiving hole (214).

C3. The method (400) of any of paragraphs C1-C2, wherein the removing (440) includes drilling an extraction hole within the installed textured pin (230), positioning a pin extractor within the extraction hole, and pulling the installed textured pin (230) from the corresponding pin-receiving hole (214).

C4. The method (400) of any of paragraphs C1-C3, wherein the inserting (450) includes inserting such that the replacement textured pin end (232) is coplanar, or at least substantially coplanar, with at least one of:
(i) a region of the layup surface (212) that defines the corresponding pin-receiving hole (214); and
(ii) an opening into the corresponding pin-receiving hole (214) that is defined by the layup surface (212).

C5. The method (400) of any of paragraphs C1-C4, wherein the inserting (450) includes inserting such that the replacement textured pin end (232) is within a threshold pin end offset distance (250) of at least one of:
(i) a/the region of the layup surface (212) that defines the corresponding pin-receiving hole (214); and
(ii) an/the opening into the corresponding pin-receiving hole (214) that is defined by the layup surface (212).

C6. The method (400) of paragraph C5, wherein the threshold pin end offset distance (250) is at most 1 mm, at most 0.9 mm, at most 0.8 mm, at most 0.7 mm, at most 0.6 mm, at most 0.5 mm, at most 0.4 mm, at most 0.3 mm, at most 0.2 mm, at most 0.1 mm, at most 90 µm, at most 80 µm, at most 70 µm, at most 60 µm, at most 55 µm, at most 50 µm, at most 45 µm, at most 40 µm, at most 35 µm, at most 30 µm, at most 25 µm, at most 20 µm, at most 15 µm, at most 10 µm, or at most 5 µm.

C7. The method (400) of any of paragraphs C1-C6, wherein the damaged layup mandrel (200) includes any suitable structure, function, and/or feature of any of the layup mandrels (200) of any of paragraphs A1-A23.

C8. The method (400) of any of paragraphs C1-C7, wherein the repaired layup mandrel (200) includes any suitable structure, function, and/or feature of any of the layup mandrels (200) of any of paragraphs A1-A23.

C9. The method (400) of any of paragraphs C1-C8, wherein, prior to the removing (440), the method (400) further includes manufacturing (410) a layup mandrel (200).

C10. The method (400) of paragraph C9, wherein the manufacturing (410) the layup mandrel (200) includes performing any suitable step of any of the methods (300) of any of paragraphs B1-B10.

C11. The method (400) of any of paragraphs C9-C10, wherein, the removing (440) is performed responsive to the layup mandrel (200) failing to meet at least one specification subsequent to the manufacturing (410).

C12. The method (400) of any of paragraphs C9-C11, wherein, subsequent to the manufacturing (410) and prior to the removing (440), the method (400) further includes utilizing (420) the layup mandrel (200) to define a composite part (80), and further wherein the removing (440) is performed responsive to wear to the layup mandrel (200) during the utilizing (420).

D1. A system (94) for forming a composite part (80) with an imprinted feature (88), the system (94) comprising:
a layup mandrel (200) that includes:
(i) a mandrel body (210) that defines a layup surface (212) that defines a layup surface finish roughness; and
(ii) a plurality of regions (236) of isotropic surface finish spaced-apart on the layup surface (212), wherein each region (236) of isotropic surface finish of the plurality of regions (236) of isotropic surface finish defines an isotropic surface finish roughness that is greater than the layup surface finish roughness, and further wherein a location of each region (236) of isotropic surface finish corresponds to a desired location for a fastener hole (86) within the composite part (80);
optionally a plurality of plies (82) of composite material configured to be positioned on the layup mandrel (200) to define an uncured composite part (81); and
optionally a cure oven (96) configured to heat the uncured composite part (81) to cure the uncured composite part (81) and define the composite part (80).

D2. The system (94) of paragraph D1, wherein the isotropic surface finish roughness has a roughness average (Ra) roughness of at least one of:
(i) at least 0.5 µm, at last 0.6 µm, at least 0.7 µm, at least 0.8 µm, at least 0.9 µm, at least 1 µm, at least 1.2 µm, at least 1.4 µm, at least 1.6 µm, at least 1.8 µm, at least 2 µm, at least 2.2 µm, at least 2.4 µm, at least 2.6 µm, at least 2.8 µm, at least 3 µm, at least 3.175 µm, at least 3.2 µm, at least 3.4 µm, at least 3.6 µm, at least 3.8 µm, at least 4 µm, at least 4.2 µm, at least 4.4 µm, at least 4.6 µm, at least 4.8 µm, at least 5 µm, at least 5.2 µm, at least 5.4 µm, at least 5.6 µm, at least 5.8 µm, or at least 6 µm; and (ii) at most 15 µm, at most 14 µm, at most 13 µm, at most 12 µm, at most 11 µm, at most 10 µm, at most 9 µm, at most 8 µm, at most 7.8 µm, at most 7.6 µm, at most 7.4 µm, at most 7.2 µm, at most 7 µm, at most 6.8 µm, at most 6.6 µm, at most 6.4 µm, at most 6.3 µm, at most 6.2 µm, at most 6 µm, at most 5.8 µm, at most 5.6 µm, at most 5.4 µm, at most 5.2 µm, at most 5 µm, at most 4.8 µm, at most 4.6 µm, at most 4.4 µm, at most 4.2 µm, at most 4 µm, at most 3.8 µm, at most 3.6 µm, at most 3.4 µm, at most 3.2 µm, or at most 3 µm.

D3. The system (94) of any of paragraphs D1-D2, wherein the isotropic surface finish roughness is a threshold roughness multiple of the layup surface finish roughness, wherein the threshold roughness multiple is at least one of:
(i) at least 1.1, at least 1.2, at least 1.3, at least 1.4, at least 1.5, at least 1.6, at least 1.7, at least 1.8, at least 1.9, at least 2, at least 2.1, at least 2.2, at least 2.3, at least 2.4, at least 2.5, at least 2.6, at least 2.7, at least 2.8, at least 2.9, or at least 3; and
(ii) at most 5, at most 4.8, at most 4.6, at most 4.4, at most 4.2, at most 4, at most 3.8, at most 3.6, at most 3.4, at most 3.2, at most 3, at most 2.8, at most 2.6, at most 2.4, at most 2.2, at most 2, at most 1.8, at most 1.6, or at most 1.4.

D4. The system (94) of any of paragraphs D1-D3, wherein the plurality of regions (236) of isotropic surface finish is defined by a plurality of isotropically textured pin end surfaces of a plurality of textured pin ends (232) of a plurality of textured pins (230).

D5. The system (94) of paragraph D4, wherein the mandrel body (210) defines a plurality of pin-receiving holes (214), and further wherein each textured pin (230) of the plurality of textured pins (230) is positioned within a corresponding pin-receiving hole (214) of the plurality of pin-receiving holes (214) such that the isotropically textured pin end surface faces away from the layup mandrel (200).

D6. The system (94) of any of paragraphs D1-D5, wherein the layup mandrel (200) instead is or includes any suitable structure, function, and/or feature of any of the layup mandrels (200) of any of paragraphs A1-A23.

E1. A method (500) of forming a composite part (80) that includes a plurality of spaced-apart imprinted features (88) configured to indicate, to a robotic drilling system (100), a location for a fastener hole (86) within the composite part (80), the method (500) comprising:
positioning (510) a plurality of plies (82) of composite material on a layup mandrel (200), wherein the layup mandrel (200) includes a mandrel body (210) that defines a layup surface (212) that defines a layup surface finish roughness, wherein the layup mandrel (200) also includes a plurality of regions (236) of isotropic surface finish spaced-apart on the layup surface (212), wherein the isotropic surface finish defines an isotropic surface finish roughness that is greater than the layup surface finish roughness, and further wherein a location of each region (236) of isotropic surface finish of the plurality of regions (236) of isotropic surface finish corresponds to a desired location for a/the fastener hole (86) within the composite part (80);
conforming (520) the plurality of plies (82) of composite material to a layup surface shape of the layup surface (212), wherein the conforming (520) includes imprinting, within at least a mandrel-contacting ply (82) of the plurality of plies (82) of composite material:

(i) the layup surface finish roughness within regions (91) of the mandrel-contacting ply (82) that contact the layup surface (212); and (ii) the isotropic surface finish roughness within regions (92) of the mandrel-contacting ply (82) that contact the plurality of regions (236) of isotropic surface finish; and curing (530) the plurality of plies (82) of composite material to define the composite part (80), wherein, subsequent to the curing (530), the composite part (80) includes the plurality of spaced-apart imprinted features (88), and further wherein a location of each spaced-apart imprinted feature (88) of the plurality of spaced-apart imprinted features (88) corresponds to a location of a corresponding region (236) of isotropic surface finish of the plurality of regions (236) of isotropic surface finish.

E2. The method (500) of paragraph E1, wherein the plurality of spaced-apart imprinted features (88) has an isotropic feature surface finish with a roughness average (Ra) roughness of at least one of:

(i) at least 0.5 µm, at last 0.6 µm, at least 0.7 µm, at least 0.8 µm, at least 0.9 µm, at least 1 µm, at least 1.2 µm, at least 1.4 µm, at least 1.6 µm, at least 1.8 µm, at least 2 µm, at least 2.2 µm, at least 2.4 µm, at least 2.6 µm, at least 2.8 µm, at least 3 µm, at least 3.175 µm, at least 3.2 µm, at least 3.4 µm, at least 3.6 µm, at least 3.8 µm, at least 4 µm, at least 4.2 µm, at least 4.4 µm, at least 4.6 µm, at least 4.8 µm, at least 5 µm, at least 5.2 µm, at least 5.4 µm, at least 5.6 µm, at least 5.8 µm, or at least 6 µm; and (ii) at most 15 µm, at most 14 µm, at most 13 µm, at most 12 µm, at most 11 µm, at most 10 µm, at most 9 µm, at most 8 µm, at most 7.8 µm, at most 7.6 µm, at most 7.4 µm, at most 7.2 µm, at most 7 µm, at most 6.8 µm, at most 6.6 µm, at most 6.4 µm, at most 6.3 µm, at most 6.2 µm, at most 6 µm, at most 5.8 µm, at most 5.6 µm, at most 5.4 µm, at most 5.2 µm, at most 5 µm, at most 4.8 µm, at most 4.6 µm, at most 4.4 µm, at most 4.2 µm, at most 4 µm, at most 3.8 µm, at most 3.6 µm, at most 3.4 µm, at most 3.2 µm, or at most 3 µm.

E3. The method (500) of any of paragraphs E1-E2, wherein an/the isotropic feature surface finish of the plurality of spaced-apart imprinted features (88) is a threshold roughness multiple of a surface roughness of a remainder of the mandrel-contacting ply (82), wherein the threshold roughness multiple is at least one of:

(i) at least 1.1, at least 1.2, at least 1.3, at least 1.4, at least 1.5, at least 1.6, at least 1.7, at least 1.8, at least 1.9, at least 2, at least 2.1, at least 2.2, at least 2.3, at least 2.4, at least 2.5, at least 2.6, at least 2.7, at least 2.8, at least 2.9, or at least 3; and (ii) at most 5, at most 4.8, at most 4.6, at most 4.4, at most 4.2, at most 4, at most 3.8, at most 3.6, at most 3.4, at most 3.2, at most 3, at most 2.8, at most 2.6, at most 2.4, at most 2.2, at most 2, at most 1.8, at most 1.6, or at most 1.4.

E4. The method (500) of any of paragraphs E1-E3, wherein the layup mandrel (200) instead is or includes any suitable structure, function, and/or feature of any of the layup mandrels (200) of any of paragraphs A1-A23.

E5. The method (500) of any of paragraphs E1-E4, wherein the layup mandrel (200) includes any suitable structure, function, and/or feature of any of the systems (94) of any of paragraphs D1-D6.

F1. A robotic system (100) for precisely performing a plurality of operations on a composite part (80) that includes a plurality of imprinted features (88), the robotic system (100) comprising:

an end effector (110) including:

(i) a vision system (120) configured to detect a corresponding imprinted feature (88) of the plurality of imprinted features (88) on a surface (84) of the composite part (80), wherein the corresponding imprinted feature (88) has an isotropic feature surface finish with a roughness that is greater than a surface roughness of a remainder of the composite part (80); and (ii) an operating assembly (124) configured to perform the plurality of operations on the composite part (80);

a positioning system (150) configured to position the end effector (110) relative to the composite part (80); and a controller (160) programmed to control operation of the robotic system (100) such that the robotic system (100) performs each operation of the plurality of operations at a corresponding operation location (130) that corresponds to a location of the corresponding imprinted feature (88) of the plurality of imprinted features (88).

F2. The robotic system (100) of paragraph F1, wherein the positioning system (150) includes a rough positioning system (152) and a fine positioning system (154), wherein the controller (160) is programmed to position the end effector (110) proximate the corresponding imprinted feature (88) utilizing the rough positioning system (152) and to refine the position of the end effector (110) relative to the corresponding imprinted feature (88) utilizing the fine positioning system (154).

F3. The robotic system (100) of any of paragraphs F1-F2, wherein the operating assembly (124) includes a drilling assembly (125) configured to define a plurality of fastener holes (86) in the composite part (80).

F4. The robotic system (100) of paragraph F3, wherein the vision system (120) is configured to view the corresponding imprinted feature (88) along an optical axis (122), wherein the drilling assembly (125) is configured to define a corresponding fastener hole (86) of the plurality of fastener holes (86) by extending a drill bit (126) along a drilling axis (128), and further wherein the optical axis (122) is coaxial, or at least substantially coaxial, with the drilling axis (128).

F5. The robotic system (100) of any of paragraphs F3-F4, wherein the robotic system (100) further includes a normality detection system (140) configured to align a/the drilling axis (128) of the drilling assembly (125) normal, or at least substantially normal, to the surface (84) of the composite part (80).

F6. The robotic system (100) of any of paragraphs F1-F4 in combination with any suitable structure, function, feature, step, and/or method of any of paragraphs A1-E5.

G1. A method (600) of precisely performing a plurality of operations on a composite part (80) that includes a plurality of imprinted features (88) defined on a surface (84) of the composite part (80), the method (600) comprising:

Detecting (620), with a vision system (120) of an end effector (110) of a robotic system (100), a corresponding imprinted feature (88) of the plurality of imprinted features (88), wherein the corresponding imprinted feature (88) has an isotropic feature surface finish with a roughness that is greater than a surface roughness of a remainder of the composite part (80);

Aligning (630), with a positioning system (150) of the robotic system (100), an operating assembly (124) of the end effector (110) relative to the corresponding imprinted feature (88); and Performing (650), with the operating assembly (124) of the robotic system (100), a corresponding operation of the plurality of operations on the composite part (80).

G2. The method (600) of paragraph G1, wherein the aligning (630) includes roughly positioning the end effector (110) relative to the corresponding imprinted feature (88) utilizing a rough positioning system (152) of the positioning system (150), and further wherein the aligning (630) includes finely positioning the end effector (110) relative to the corresponding imprinted feature (88) utilizing a fine positioning system (154) of the positioning system (150).

G3. The method (600) of any of paragraphs G1-G2, wherein the aligning (630) includes utilizing the vision system (120) to view the corresponding imprinted feature (88), and further wherein the method (600) includes retracting (640) the vision system (120) and transitioning to the performing (650) without moving the operating assembly (124).

G4. The method (600) of any of paragraphs G1-G3, wherein the operating assembly (124) includes drilling with a drilling assembly (125) configured to define a plurality of fastener holes (86) in the composite part (80), and further wherein the aligning (630) includes aligning such that a drilling axis (128) of the drilling assembly (125) is normal to the surface (84) of the composite part (80) during the drilling.

G5. The method (600) of any of paragraphs G1-G4, wherein the method (600) further includes repeating (660) the method (600) to perform the plurality of operations on the composite part (80).

G6. The method (600) of any of paragraphs G1-G5 in combination with any suitable structure, function, feature, step, and/or method of any of paragraphs A1-F6.

G7. The method (600) of any of paragraphs G1-G6, wherein, prior to the detecting (620), the method (600) further includes forming (610) the composite part (80) utilizing the method (500) of any of paragraphs E1-E5.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A system for forming a composite part with an imprinted feature, the system comprising:
   a layup mandrel that includes:
   (i) a mandrel body that defines a layup surface that defines a layup surface finish roughness, wherein the layup surface is configured to receive a plurality of plies of composite material to define a surface contour of the composite part; and
   a plurality of regions of isotropic surface finish spaced apart on the layup surface, wherein each region of isotropic surface finish of the plurality of regions of isotropic surface finish is defined by a corresponding textured pin of a plurality of textured pins, wherein each region of isotropic surface finish of the plurality of regions of isotropic surface finish defines a region surface finish roughness that is greater than the layup surface finish roughness, and further wherein each region of isotropic surface finish of the plurality of regions of isotropic surface finish forms an imprinted feature in the composite part that indicates a desired location for a fastener hole to be formed within the composite part.

2. The system of claim 1, wherein the region surface finish roughness has a roughness average (Ra) roughness of at least 0.5 micrometers (μm) and at most 15 μm.

3. The system of claim 1, wherein the region surface finish roughness is a threshold roughness multiple of the layup surface finish roughness, wherein the threshold roughness multiple is at least 1.5.

4. The system of claim 1, wherein each region of isotropic surface finish of the plurality of regions of isotropic surface finish is defined by a corresponding isotropically textured pin end surface of a plurality of isotropically textured pin end surfaces of a plurality of textured pin ends of the plurality of textured pins.

5. The system of claim 4, wherein the mandrel body defines a plurality of pin-receiving holes, and further wherein each textured pin of the plurality of textured pins is positioned within a corresponding pin-receiving hole of the plurality of pin-receiving holes such that each isotropically textured pin end surface of the plurality of isotropically textured pin end surfaces faces away from the layup mandrel.

6. The system of claim 1, wherein the system further includes:
   the plurality of plies of composite material configured to be positioned on the layup mandrel to define an uncured composite part; and
   a cure oven configured to heat the uncured composite part to cure the uncured composite part into the composite part.

7. The system of claim 1, wherein:
   the mandrel body further defines a plurality of pin-receiving holes, wherein each pin-receiving hole of the plurality of pin-receiving holes extends from the layup surface and into the mandrel body,
   and wherein each textured pin of the plurality of textured pins:
   (i) is positioned within a corresponding pin-receiving hole of the plurality of pin-receiving holes; and
   (ii) has a textured pin end that defines an isotropically textured pin end surface that faces away from the layup mandrel and defines a corresponding region of isotropic surface finish of the plurality of regions of isotropic surface finish.

8. The system of claim 7, wherein each textured pin of the plurality of textured pins is sized for a friction fit within the corresponding pin-receiving hole.

9. The system of claim 7, wherein each textured pin of the plurality of textured pins includes an at least substantially cylindrical pin region.

10. The system of claim 7, wherein each textured pin of the plurality of textured pins defines a pin diameter of at least 2 millimeters (mm) and at most 8 mm.

11. The system of claim 7, wherein the textured pin end of each textured pin of the plurality of textured pins is an at least substantially circular textured pin end.

12. The system of claim 7, wherein the textured pin end of each textured pin of the plurality of textured pins is an at least substantially planar textured pin end.

13. The system of claim 7, wherein the textured pin end of each textured pin of the plurality of textured pins is an abrasive grit blasted textured pin end.

14. The system of claim 7, wherein the textured pin end of each textured pin of the plurality of textured pins is at least substantially coplanar with at least one of:
   (i) a region of the layup surface that defines the corresponding pin-receiving hole; and
   (ii) an opening into the corresponding pin-receiving hole that is defined by the layup surface.

15. The system of claim 7, wherein the textured pin end of each textured pin of the plurality of textured pins is within a threshold pin end offset distance of at least one of:
   (i) a region of the layup surface that defines the corresponding pin-receiving hole; and
   (ii) an opening into the corresponding pin-receiving hole that is defined by the layup surface.

16. The system of claim 15, wherein the threshold pin end offset distance is at most 1 mm.

17. A method of forming a composite part that includes a plurality of spaced apart imprinted features configured to indicate, to a robotic drilling system, a location for a fastener hole to be formed within the composite part, the method comprising:
   positioning a plurality of plies of composite material on a layup mandrel, wherein the layup mandrel includes a mandrel body that defines a layup surface that defines a layup surface finish roughness, wherein the layup mandrel also includes a plurality of regions of isotropic surface finish, wherein each region of isotropic surface finish of the plurality of regions of isotropic surface finish is defined by a corresponding textured pin of a plurality of textured pins spaced apart on the layup surface, wherein the isotropic surface finish defines a region surface finish roughness that is greater than the layup surface finish roughness, and further wherein each region of isotropic surface finish of the plurality of regions of isotropic surface finish forms an imprinted feature in the composite part that indicates a desired location for the fastener hole to be formed within the composite part;
   conforming the plurality of plies of composite material to a layup surface shape of the layup surface, wherein the conforming includes imprinting, within at least a mandrel-contacting ply of the plurality of plies of composite material:
(i) the layup surface finish roughness within regions of the mandrel-contacting ply that contact the layup surface; and
(ii) the region surface finish roughness within regions of the mandrel-contacting ply that contact the plurality of regions of isotropic surface finish; and
curing the plurality of plies of composite material to define the composite part, wherein, subsequent to the curing, the composite part includes the plurality of spaced apart imprinted features, and further wherein a location of each spaced apart imprinted feature of the plurality of spaced apart imprinted features corresponds to a location of a corresponding region of isotropic surface finish of the plurality of regions of isotropic surface finish.

18. The method of claim 17, wherein each of the plurality of spaced apart imprinted features has an isotropic feature surface finish with a roughness average (Ra) roughness of at least 0.5 µm and at most 15 µm.

19. The method of claim 17, wherein an isotropic feature surface finish of the plurality of spaced apart imprinted features is a threshold roughness multiple of a surface roughness of a remainder of the mandrel-contacting ply, wherein the threshold roughness multiple is at least 1.5.

20. A method of precisely performing a plurality of operations on a composite part formed by the method of claim 17, the method comprising:
detecting, with a vision system of an end effector of a robotic system, a corresponding imprinted feature of the plurality of spaced apart imprinted features;
aligning, with a positioning system of the robotic system, an operating assembly of the end effector relative to the corresponding imprinted feature; and
performing, with the operating assembly of the robotic system, a corresponding operation of the plurality of operations on the composite part.

* * * * *